US012763377B2

(12) United States Patent
Hiratsuka

(10) Patent No.: US 12,763,377 B2
(45) Date of Patent: Oct. 13, 2026

(54) SECONDARY BATTERY INCLUDING WOUND ELECTRODE BODY AND BATTERY PACK

(71) Applicant: MURATA MANUFACTURING CO., LTD., Kyoto (JP)

(72) Inventor: Toshihiro Hiratsuka, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 597 days.

(21) Appl. No.: 18/229,344

(22) Filed: Aug. 2, 2023

(65) Prior Publication Data

US 2024/0072307 A1 Feb. 29, 2024

(30) Foreign Application Priority Data

Aug. 31, 2022 (JP) ................................ 2022-138250

(51) Int. Cl.

| | |
|---|---|
| ***H01M 10/0587*** | (2010.01) |
| ***H01M 10/0525*** | (2010.01) |
| ***H01M 10/0567*** | (2010.01) |
| ***H01M 10/0568*** | (2010.01) |
| ***H01M 10/42*** | (2006.01) |

(52) U.S. Cl.

CPC ... *H01M 10/0587* (2013.01); *H01M 10/0525* (2013.01); *H01M 10/0567* (2013.01); *H01M 10/0568* (2013.01); *H01M 10/4257* (2013.01)

(58) Field of Classification Search

CPC ......... H01M 10/0587; H01M 10/0525; H01M 10/0567; H01M 10/0568; H01M 10/4257

See application file for complete search history.

(56) References Cited

U.S. PATENT DOCUMENTS

2015/0263376 A1* 9/2015 Kondo ................ H01M 50/103 429/94
2018/0351212 A1* 12/2018 Matsui ................ H01M 10/425

FOREIGN PATENT DOCUMENTS

JP H0574498 A 3/1993
JP 2004087324 A 3/2004
JP 2008077996 A 4/2008

(Continued)

OTHER PUBLICATIONS

JP_2015138729 English Translation (Year: 2015).*

*Primary Examiner* — Jimmy Vo

(74) *Attorney, Agent, or Firm* — K&L Gates LLP

(57) ABSTRACT

A positive electrode includes: a positive electrode current collector including an inner peripheral surface and an outer peripheral surface; an inner periphery side positive electrode active material layer; and an outer periphery side positive electrode active material layer. A negative electrode includes: a negative electrode current collector including an inner peripheral surface and an outer peripheral surface; an inner periphery side negative electrode active material layer; and an outer periphery side negative electrode active material layer. An innermost wind portion of the negative electrode is located on an inner side relative to an innermost wind portion of the positive electrode. An inner periphery side edge of the outer periphery side negative electrode active material layer is located closer to a central axis of a wound electrode body than an inner periphery side edge of the inner periphery side negative electrode active material layer.

13 Claims, 13 Drawing Sheets

(56) References Cited

FOREIGN PATENT DOCUMENTS

| | | | | |
|---|---|---|---|---|
| JP | 2014102889 | A | | 6/2014 |
| JP | 2015138729 | A | * | 7/2015 |

* cited by examiner (EXAMPLE 3)

(COMPARATIVE EXAMPLE 1)

(COMPARATIVE EXAMPLE 3)

SECONDARY BATTERY INCLUDING WOUND ELECTRODE BODY AND BATTERY PACK

CROSS-REFERENCE TO RELATED APPLICATIONS

The present application claims priority from Japanese Patent Application No. 2022-138250 filed on Aug. 31, 2022, the entire contents of which are hereby incorporated by reference.

BACKGROUND

The present disclosure relates to a secondary battery, and a battery pack including the secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolyte that are contained inside an outer package member. A configuration of the secondary battery has been considered in various ways.

A secondary battery that employs what is called a tabless structure reduces an internal resistance and allows for charging and discharging with a relatively large current.

SUMMARY

A secondary battery according to an embodiment of the present disclosure includes a wound electrode body, a positive electrode current collector plate, a negative electrode current collector plate, an electrolytic solution, and a battery can. The wound electrode body includes a stack wound around a central axis extending in a first direction. The stack includes a positive electrode, a negative electrode, and a separator. The positive electrode and the negative electrode are stacked with the separator interposed therebetween. The positive electrode current collector plate is disposed to face a first end face of the wound electrode body, the first end face being an end face in the first direction. The negative electrode current collector plate is disposed to face a second end face of the wound electrode body, the second end face being opposite to the first end face in the first direction. The battery can contains the wound electrode body, the positive electrode current collector plate, the negative electrode current collector plate, and the electrolytic solution. The positive electrode includes a positive electrode current collector, an inner periphery side positive electrode active material layer, and an outer periphery side positive electrode active material layer. The positive electrode current collector includes an inner peripheral surface of the positive electrode current collector located on a side of the central axis of the wound electrode body, and an outer peripheral surface of the positive electrode current collector opposite to the inner peripheral surface of the positive electrode current collector. The inner periphery side positive electrode active material layer covers a portion or all of the inner peripheral surface of the positive electrode current collector. The outer periphery side positive electrode active material layer covers a portion or all of the outer peripheral surface of the positive electrode current collector. The negative electrode includes a negative electrode current collector, an inner periphery side negative electrode active material layer, and an outer periphery side negative electrode active material layer. The negative electrode current collector includes an inner peripheral surface of the negative electrode current collector located on the side of the central axis of the wound electrode body, and an outer peripheral surface of the negative electrode current collector opposite to the inner peripheral surface of the negative electrode current collector. The inner periphery side negative electrode active material layer covers a portion or all of the inner peripheral surface of the negative electrode current collector. The outer periphery side negative electrode active material layer covers a portion or all of the outer peripheral surface of the negative electrode current collector. In the wound electrode body, an innermost wind portion of the negative electrode is located on an inner side relative to an innermost wind portion of the positive electrode. The outer periphery side negative electrode active material layer has an inner periphery side edge located closer to the central axis of the wound electrode body than an inner periphery side edge of the inner periphery side negative electrode active material layer.

A battery pack according to an embodiment of the present disclosure includes a secondary battery, a processor, and an outer package body. The secondary battery includes a wound electrode body, a positive electrode current collector plate, a negative electrode current collector plate, an electrolytic solution, and a battery can. The wound electrode body includes a stack wound around a central axis extending in a first direction. The stack includes a positive electrode, a negative electrode, and a separator. The positive electrode and the negative electrode are stacked with the separator interposed therebetween. The positive electrode current collector plate is disposed to face a first end face of the wound electrode body, the first end face being an end face in the first direction. The negative electrode current collector plate is disposed to face a second end face of the wound electrode body, the second end face being opposite to the first end face in the first direction. The battery can contains the wound electrode body, the positive electrode current collector plate, the negative electrode current collector plate, and the electrolytic solution. The positive electrode includes a positive electrode current collector, an inner periphery side positive electrode active material layer, and an outer periphery side positive electrode active material layer. The positive electrode current collector includes an inner peripheral surface of the positive electrode current collector located on a side of the central axis of the wound electrode body, and an outer peripheral surface of the positive electrode current collector opposite to the inner peripheral surface of the positive electrode current collector. The inner periphery side positive electrode active material layer covers a portion or all of the inner peripheral surface of the positive electrode current collector. The outer periphery side positive electrode active material layer covers a portion or all of the outer peripheral surface of the positive electrode current collector. The negative electrode includes a negative electrode current collector, an inner periphery side negative electrode active material layer, and an outer periphery side negative electrode active material layer. The negative electrode current collector includes an inner peripheral surface of the negative electrode current collector located on the side of the central axis of the wound electrode body, and an outer peripheral surface of the negative electrode current collector opposite to the inner peripheral surface of the negative electrode current collector. The inner periphery side negative electrode active material layer covers a portion or all of the inner peripheral surface of the negative electrode current collector. The outer periphery side negative electrode active material layer covers a portion or all of the outer peripheral surface of the negative electrode current collector. In the wound electrode body, an innermost wind portion of the negative electrode is located on an inner side relative to an innermost wind portion of the positive electrode. The outer periphery side negative electrode active material layer has an inner periphery side edge located closer to the central axis of the wound electrode body than an inner periphery side edge of the inner periphery side negative electrode active material layer. The processor controls the secondary battery. The outer package body contains the secondary battery.

BRIEF DESCRIPTION OF THE FIGURES

The accompanying drawings are included to provide a further understanding of the present technology and are incorporated in and constitute a part of this specification. The drawings illustrate examples and, together with the specification, serve to explain the principles of the present technology according to an embodiment.

DETAILED DESCRIPTION

Figure 1:
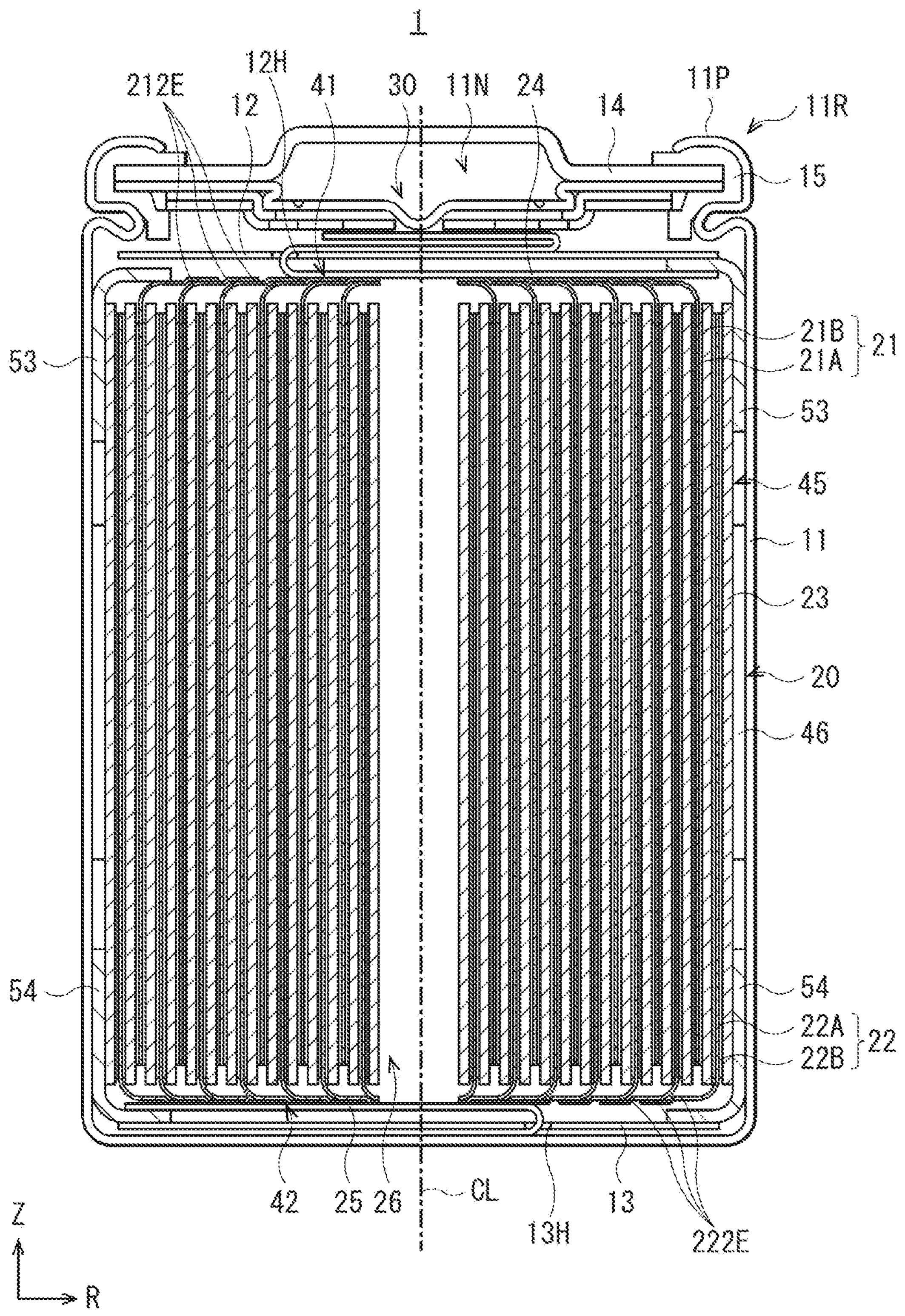
FIG. 1 is a sectional view of a configuration of a secondary battery according to an embodiment of the present disclosure.

Consideration has been given in various ways to improve performance of a secondary battery. However, there is still room for further improvement in performance of the secondary battery.

It is desirable to provide a secondary battery with higher reliability.

In the following, one or more embodiments of the present disclosure are described in further detail including with reference to the accompanying drawings. Note that the following description is directed to illustrative examples of the present technology and not to be construed as limiting to the present technology. Factors including, without limitation, numerical values, shapes, materials, components, positions of the components, and how the components are coupled to each other are illustrative only and not to be construed as limiting to the present technology. Further, elements described herein which are not recited in a most-generic independent claim of the present technology are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the present technology are unillustrated in the drawings.

A description is given first of a secondary battery according to an embodiment of the present disclosure.

An embodiment is described with reference to an example of a lithium-ion secondary battery of a cylindrical type that has a cylindrical shape in external appearance. However, the secondary battery according to an embodiment of the present disclosure is not limited to the lithium-ion secondary battery of the cylindrical type, and may have a shape other than the cylindrical shape in external appearance, or may be a battery that uses an electrode reactant other than lithium.

Although a charge and discharge principle of the secondary battery is not particularly limited, the following description deals with a case where a battery capacity is obtained through the use of insertion and extraction of an electrode reactant. The secondary battery includes a positive electrode, a negative electrode, and an electrolyte. In the secondary battery, to prevent precipitation of the electrode reactant on a surface of the negative electrode during charging, a charge capacity of the negative electrode may be greater than a discharge capacity of the positive electrode. For example, an electrochemical capacity per unit area of the negative electrode may be set to be greater than an electrochemical capacity per unit area of the positive electrode.

The electrode reactant is not particularly limited in kind as described above, and non-limiting examples thereof may include a light metal such as an alkali metal or an alkaline earth metal. Non-limiting examples of the alkali metal may include lithium, sodium, and potassium. Non-limiting examples of the alkaline earth metal may include beryllium, magnesium, and calcium.

In the following, described as an example is a case where the electrode reactant is lithium. A secondary battery that obtains a battery capacity using insertion and extraction of lithium is what is called a lithium-ion secondary battery. In the lithium-ion secondary battery, lithium may be inserted and extracted in an ionic state.

FIG. 1 illustrates a sectional configuration of a lithium-ion secondary battery 1 according to an embodiment along a height direction. Hereinafter, the lithium-ion secondary battery 1 will be simply referred to as a secondary battery 1. In the secondary battery 1 illustrated in FIG. 1, a wound electrode body 20 as a battery device is contained inside an outer package can 11. The outer package can 11 may have a cylindrical shape.

For example, the secondary battery 1 may include, inside the outer package can 11, a pair of insulating plates 12 and 13, the wound electrode body 20, a positive electrode current collector plate 24, and a negative electrode current collector plate 25. The wound electrode body 20 may be a structure in which a positive electrode 21 and a negative electrode 22 are stacked with a separator 23 interposed therebetween and the stack of the positive electrode 21, the negative electrode 22, and the separator 23 is wound. The wound electrode body 20 may be impregnated with an electrolytic solution. The electrolytic solution may be a liquid electrolyte. Note that the secondary battery 1 may further include one or more components inside the outer package can 11. Non-limiting examples of the one or more components may include a thermosensitive resistive device (what is called a positive temperature coefficient (PTC) device) and a reinforcing member.

For example, the outer package can 11 may have a hollow cylindrical structure with an upper end part and a lower end part in the height direction, i.e., a Z-axis direction. The lower end part may be closed and the upper end part may be open. The upper end part of the outer package can 11 may thus serve as an open end part 11N. The outer package can 11 may include, for example, a metal material such as iron. Note that the outer package can 11 may have a surface plated with, for example, a metal material such as nickel. The insulating plates 12 and 13 may be opposed to each other with the wound electrode body 20 interposed therebetween in the Z-axis direction, for example. In this specification, the open end part 11N and a vicinity thereof may be referred to as an upper part of the secondary battery 1, and a region where the outer package can 11 is closed and a vicinity thereof may be referred to as a lower part of the secondary battery 1, the upper part and the lower part of the secondary battery 1 being in the Z-axis direction.

The insulating plates 12 and 13 may each be, for example, a dish-shaped plate member having a surface perpendicular to a winding axis of the wound electrode body 20, that is, a surface perpendicular to the Z-axis in FIG. 1. The insulating plates 12 and 13 may be disposed with the wound electrode body 20 interposed therebetween.

The open end part 11N of the outer package can 11 may be provided with a crimp structure 11R, that is, a structure in which a battery cover 14 and a safety valve mechanism 30 are crimped via a gasket 15. The outer package can 11 may be sealed by the battery cover 14, with the wound electrode body 20 and other components being contained inside the outer package can 11. The crimp structure 11R may include a bent part 11P serving as what is called a crimp part.

For example, the battery cover 14 may be a closing member that closes the open end part 11N of the outer package can 11 in a state where the wound electrode body 20 and other components are contained inside the outer package can 11. The battery cover 14 may include a material similar to the material included in the outer package can 11, for example. The battery cover 14 may have a middle region protruding upward, i.e., in a +Z direction. The battery cover 14 may thus have a peripheral region that is other than the middle region and is in contact with the safety valve mechanism 30, for example.

For example, the gasket 15 may be a sealing member interposed between the bent part 11P of the outer package can 11 and the battery cover 14. The gasket 15 may seal a gap between the bent part 11P and the battery cover 14. Note that the gasket 15 may have a surface coated with, for example, asphalt. The gasket 15 may include any one or more of insulating materials, for example. The insulating material is not particularly limited in kind, and non-limiting examples thereof may include a polymer material such as polybutylene terephthalate (PBT) or polypropylene (PP). In an embodiment, the insulating material may be polybutylene terephthalate. One reason for this is that in such a case, the gap between the bent part 11P and the battery cover 14 is sufficiently sealed while the outer package can 11 and the battery cover 14 are electrically separated from each other.

For example, upon an increase in pressure inside the outer package can 11, i.e., an increase in internal pressure of the outer package can 11, the safety valve mechanism 30 may cancel the sealed state of the outer package can 11 to thereby release the internal pressure on an as-needed basis. Examples of a cause of the increase in the internal pressure of the outer package can 11 may include a gas generated due to a decomposition reaction of the electrolytic solution during charging and discharging. The internal pressure of the outer package can 11 can also increase due to heating from outside.

The wound electrode body 20 may be a power generation device that causes charging and discharging reactions to proceed. The wound electrode body 20 is contained inside the outer package can 11. The wound electrode body 20 may include the positive electrode 21, the negative electrode 22, the separator 23, and the electrolytic solution, i.e., a liquid electrolyte.

Figure 2:
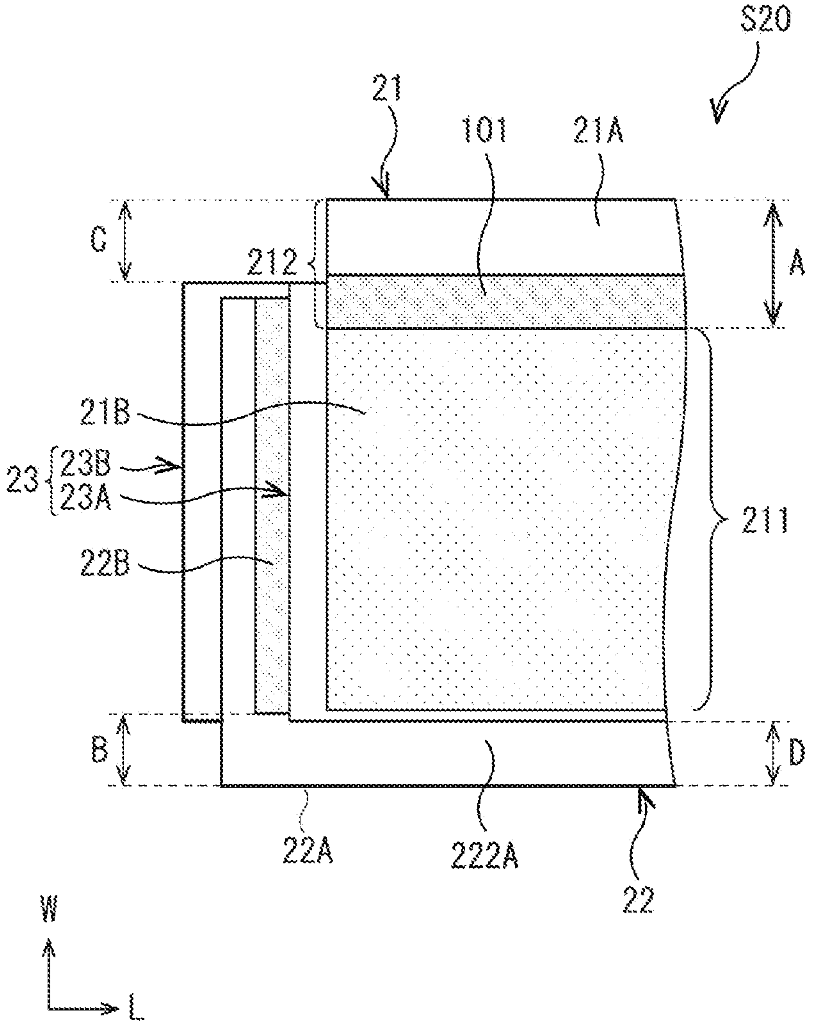
FIG. 2 is a schematic diagram illustrating a configuration example of a stack including a positive electrode, a negative electrode, and a separator illustrated in FIG. 1.
Figure 3A:
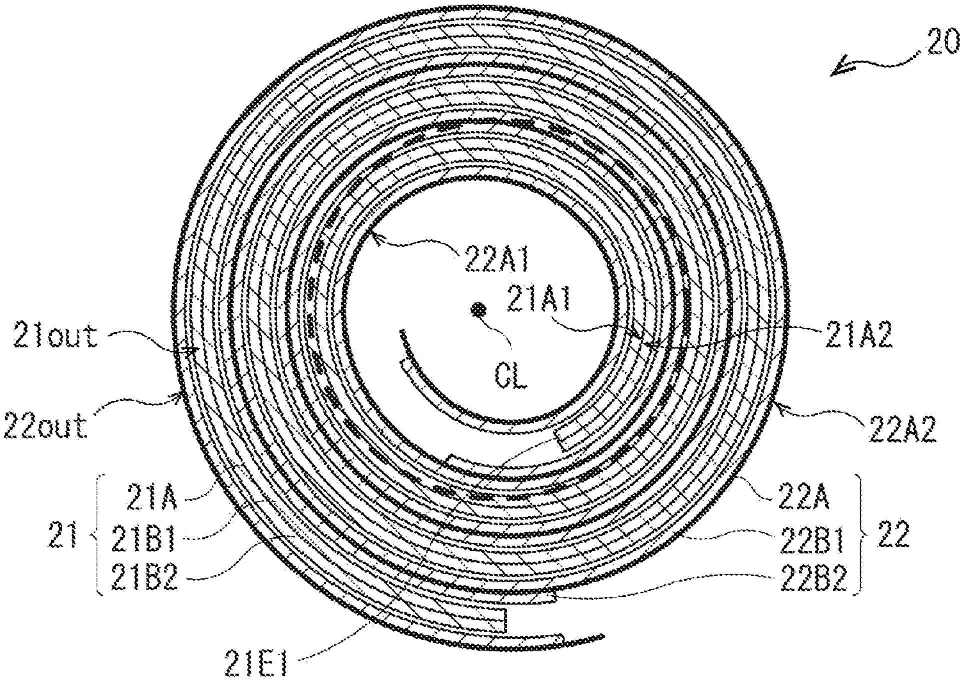
FIG. 3A is a sectional diagram illustrating a configuration example of a sectional structure of a wound electrode body illustrated in FIG. 1.
Figure 3B:
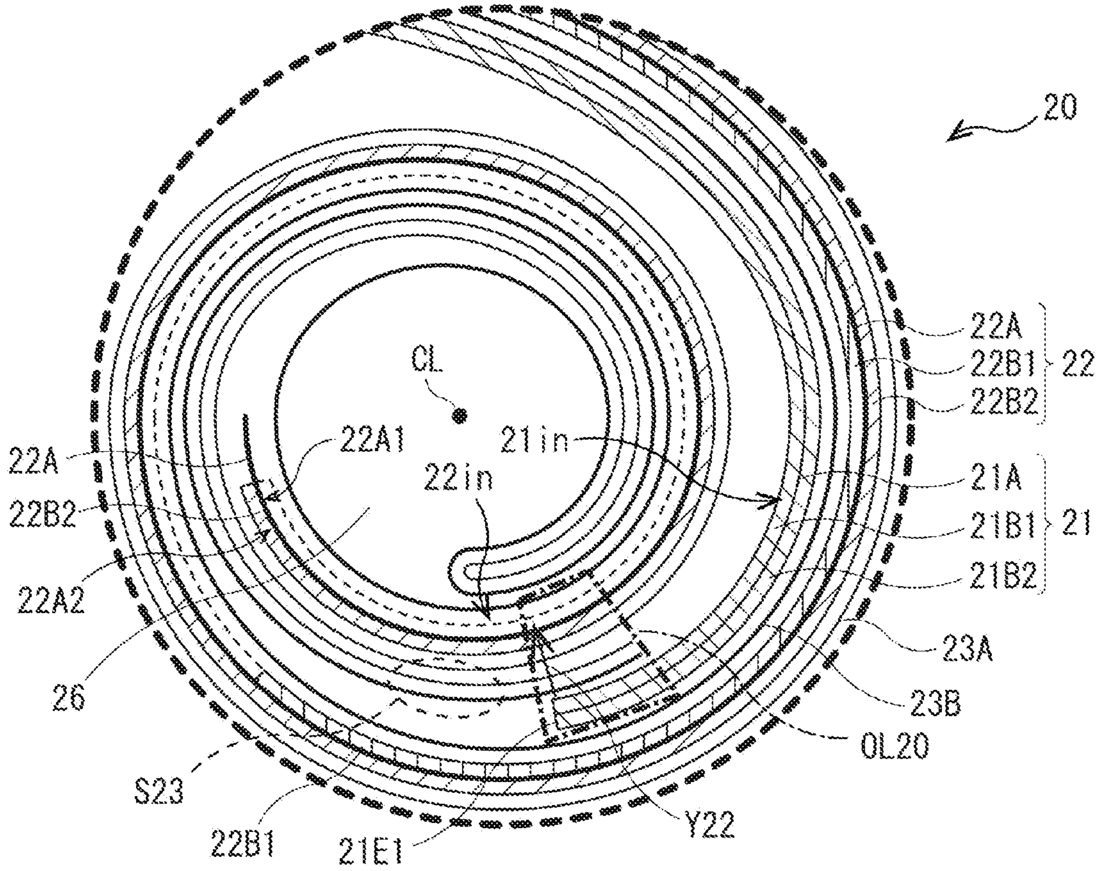
FIG. 3B is an enlarged sectional view of a portion of the wound electrode body illustrated in FIG. 3A.

FIG. 2 is a developed view of the wound electrode body 20, and schematically illustrates a portion of a stack S20 including the positive electrode 21, the negative electrode 22, and the separator 23. In the stack S20 resulting from developing the wound electrode body 20, the positive electrode 21 and the negative electrode 22 are stacked on each other with the separator 23 interposed therebetween. For example, the separator 23 may include two bases, that is, a first separator member 23A and a second separator member 23B. The wound electrode body 20 may thus include the stack S20 having a four-layer structure in which the positive electrode 21, the first separator member 23A, the negative electrode 22, and the second separator member 23B are stacked in order. The positive electrode 21, the first separator member 23A, the negative electrode 22, and the second separator member 23B may each be a substantially band-shaped member in which a lateral direction is in a W-axis direction and a longitudinal direction is in an L-axis direction. As illustrated in FIG. 3A, the wound electrode body 20 may include the stack S20 that is wound around a central axis CL (see FIG. 1) extending in the Z-axis direction, to form a spiral shape in a horizontal section orthogonal to the Z-axis direction. Here, the stack S20 may be wound in an orientation in which the W-axis direction substantially coincides with the Z-axis direction. Note that FIG. 3A illustrates a configuration example of the wound electrode body 20 along a horizontal section orthogonal to the Z-axis direction. To secure visibility, however, FIG. 3A omits illustration of the separator 23. FIG. 3B illustrates an enlarged view of a region encircled with a dashed line in FIG. 3A. The wound electrode body 20 may be substantially cylindrical in external appearance as a whole. The positive electrode 21 and the negative electrode 22 may be wound while keeping a state of being opposed to each other with the separator 23 interposed therebetween. The wound electrode body 20 may have a through hole 26 as an internal space at a center thereof. The through hole 26 may serve as a hole into which a winding core for assembling the wound electrode body 20 is to be inserted and into which an electrode rod for welding is to be inserted.

The positive electrode 21, the negative electrode 22, and the separator 23 may be so wound as to allow the separator 23 to be located in each of an outermost wind and an innermost wind of the wound electrode body 20. In the outermost wind of the wound electrode body 20, the negative electrode 22 may be disposed on an outer side relative to the positive electrode 21. For example, as illustrated in FIG. 3A, an outermost wind portion 21*out* of the positive electrode 21, i.e., a portion of the positive electrode 21 included in the wound electrode body 20 and located in an outermost wind of the positive electrode 21, may be located on an inner side relative to an outermost wind portion 22*out* of the negative electrode 22, i.e., a portion of the negative electrode 22 included in the wound electrode body 20 and located in an outermost wind of the negative electrode 22. Here, the outermost wind portion 21*out* of the positive electrode 21 may correspond to an outermost one-wind portion of the positive electrode 21 in the wound electrode body 20. The outermost wind portion 22*out* of the negative electrode 22 may correspond to an outermost one-wind portion of the negative electrode 22 in the wound electrode body 20. In contrast, in the innermost wind of the wound electrode body 20, the negative electrode 22 may be disposed on the inner side relative to the positive electrode 21. For example, as illustrated in FIG. 3B, an innermost wind portion 22*in* of the negative electrode 22, i.e., a portion of the negative electrode 22 included in the wound electrode body 20 and located in an innermost wind of the negative electrode 22, may be located on the inner side relative to an innermost wind portion 21*in* of the positive electrode 21, i.e., a portion of the positive electrode 21 included in the wound electrode body 20 and located in an innermost wind of the positive electrode 21. Here, the innermost wind portion 21*in* of the positive electrode 21 may correspond to an innermost one-wind portion of the positive electrode 21 in the wound electrode body 20. The innermost wind portion 22*in* of the negative electrode 22 may correspond to an innermost one-wind portion of the negative electrode 22 in the wound electrode body 20. The number of winds of each of the positive electrode 21, the negative electrode 22, and the separator 23 is not particularly limited, and may be set to any number.

Figure 4A:
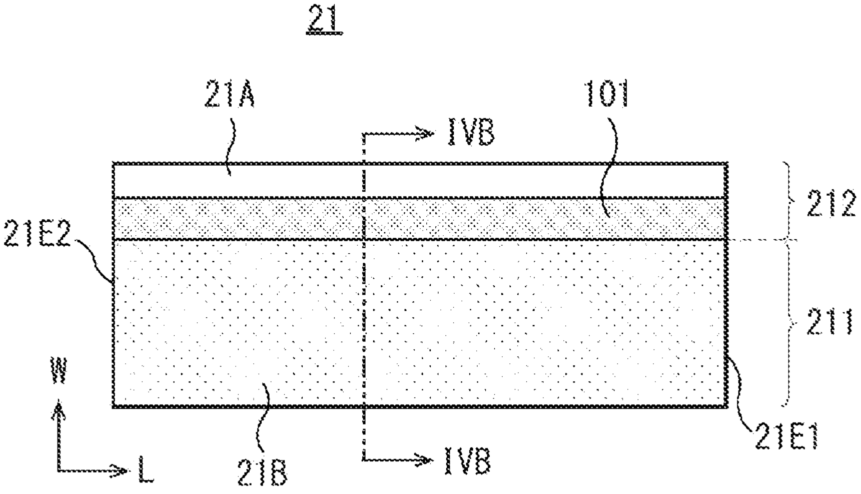
FIG. 4A is a developed view of the positive electrode illustrated in FIG. 1.
Figure 4B:
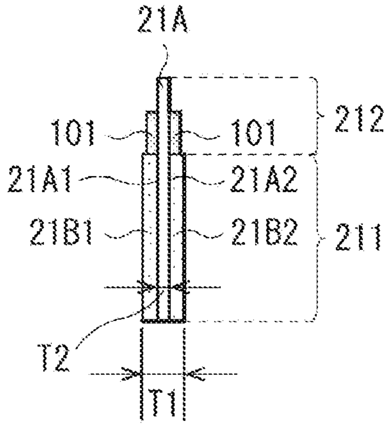
FIG. 4B is a sectional view of the positive electrode illustrated in FIG. 1.

FIG. 4A is a developed view of the positive electrode 21, and schematically illustrates a state before winding. FIG. 4B illustrates a sectional configuration of the positive electrode 21. Note that FIG. 4B illustrates a section as viewed in an arrowed direction along line IVB-IVB illustrated in FIG. 4A. The positive electrode 21 may include, for example, a positive electrode current collector 21A, and a positive electrode active material layer 21B provided on the positive electrode current collector 21A. The positive electrode active material layer 21B may be provided only on one surface of the positive electrode current collector 21A, or on each of both surfaces of the positive electrode current collector 21A, for example. FIG. 4B illustrates an example case where the positive electrode active material layer 21B is provided on each of both surfaces of the positive electrode current collector 21A. In one example, the positive electrode current collector 21A includes an inner peripheral surface 21A1 and an outer peripheral surface 21A2 of the positive electrode current collector 21A. The inner peripheral surface 21A1 of the positive electrode current collector 21A may face toward a winding center of the wound electrode body 20, that is, toward the central axis CL. The outer peripheral surface 21A2 of the positive electrode current collector 21A may face away from the winding center of the wound electrode body 20, that is, may be located on a side opposite to the inner peripheral surface 21A1 of the positive electrode current collector 21A. The positive electrode 21 includes an inner periphery side positive electrode active material layer 21B1 and an outer periphery side positive electrode active material layer 21B2, as the positive electrode active material layers 21B. The inner periphery side positive electrode active material layer 21B1 covers a portion or all of the inner peripheral surface 21A1 of the positive electrode current collector 21A. The outer periphery side positive electrode active material layer 21B2 covers a portion or all of the outer peripheral surface 21A2 of the positive electrode current collector 21A. In this specification, the inner periphery side positive electrode active material layer 21B1 and the outer periphery side positive electrode active material layer 21B2 may each be generically referred to as the positive electrode active material layer 21B, without being distinguished from each other.

The positive electrode 21 may include a positive electrode covered part 211 in which the positive electrode current collector 21A is covered with the positive electrode active material layer 21B, and a positive electrode exposed part 212 in which the positive electrode current collector 21A is exposed without being covered with the positive electrode active material layer 21B. As illustrated in FIG. 4A, the positive electrode covered part 211 and the positive electrode exposed part 212 may each extend along the L-axis direction, i.e., the longitudinal direction of the positive electrode 21, from an inner periphery side edge 21E1 to an outer periphery side edge 21E2 of the positive electrode 21 in the wound electrode body 20. Here, the L-axis direction may correspond to a winding direction of the wound electrode body 20. For example, in the positive electrode 21, the positive electrode current collector 21A may be covered with the positive electrode active material layer 21B over a region from the inner periphery side edge 21E1 of the positive electrode 21 to the outer periphery side edge 21E2 of the positive electrode 21 in the winding direction of the wound electrode body 20. The positive electrode covered part 211 and the positive electrode exposed part 212 may be adjacent to each other in the W-axis direction, i.e., the lateral direction of the positive electrode 21. Note that the positive electrode exposed part 212 may have a first edge part 212E coupled to the positive electrode current collector plate 24, as illustrated in FIG. 1. In an embodiment, an insulating layer 101 may be provided in the vicinity of a boundary between the positive electrode covered part 211 and the positive electrode exposed part 212. In an embodiment, as with the positive electrode covered part 211 and the positive electrode exposed part 212, the insulating layer 101 may also extend from the inner periphery side edge 21E1 to the outer periphery side edge 21E2 in the wound electrode body 20. In an embodiment, the insulating layer 101 may be adhered to the first separator member 23A, the second separator member 23B, or both. One reason for this is that in such a case, it is possible to prevent misalignment between the positive electrode 21 and the separator 23. In an embodiment, the insulating layer 101 may include a resin containing polyvinylidene difluoride (PVDF). One reason for this is that when the insulating layer 101 contains PVDF, the insulating layer 101 may be swollen by, for example, a solvent included in the electrolytic solution, thus becoming favorably adherable to the separator 23. Note that a detailed configuration of the positive electrode 21 will be described later.

Figure 5A:
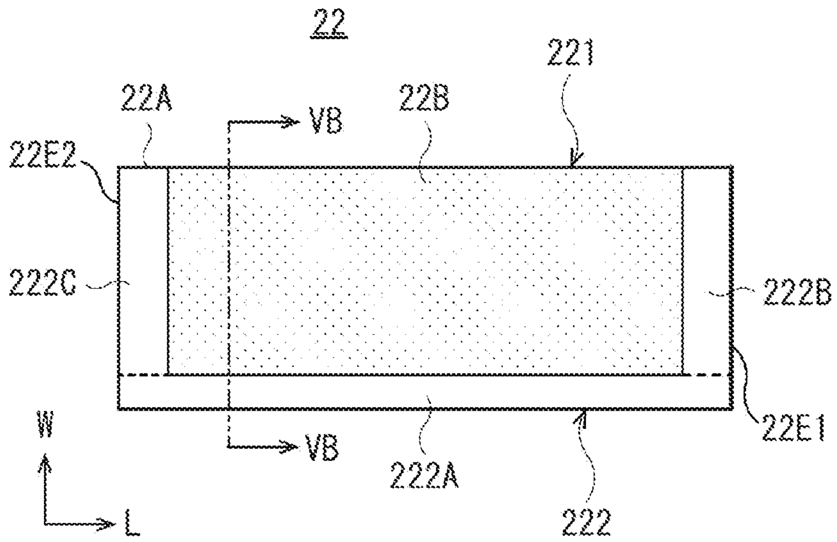
FIG. 5A is a developed view of the negative electrode illustrated in FIG. 1.
Figure 5B:
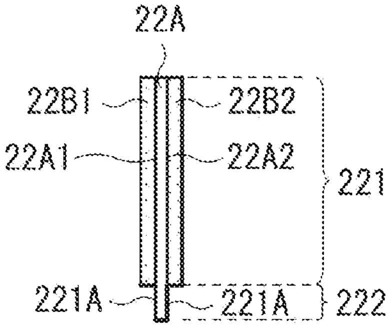
FIG. 5B is a sectional view of the negative electrode illustrated in FIG. 1.

FIG. 5A is a developed view of the negative electrode 22, and schematically illustrates a state before winding. FIG. 5B illustrates a sectional configuration of the negative electrode 22. Note that FIG. 5B illustrates a section as viewed in an arrowed direction along line VB-VB illustrated in FIG. 5A. The negative electrode 22 may include, for example, a negative electrode current collector 22A, and a negative electrode active material layer 22B provided on the negative electrode current collector 22A. The negative electrode active material layer 22B may be provided only on one surface of the negative electrode current collector 22A, or on each of both surfaces of the negative electrode current collector 22A, for example. FIG. 5B illustrates an example case where the negative electrode active material layer 22B is provided on each of both surfaces of the negative electrode current collector 22A. In one example, the negative electrode current collector 22A includes an inner peripheral surface 22A1 and an outer peripheral surface 22A2 of the negative electrode current collector 22A. The inner peripheral surface 22A1 of the negative electrode current collector 22A may face toward the winding center of the wound electrode body 20, that is, toward the central axis CL. The outer peripheral surface 22A2 of the negative electrode current collector 22A may face away from the winding center of the wound electrode body 20, that is, may be located on a side opposite to the inner peripheral surface 22A1 of the negative electrode current collector 22A. The negative electrode 22 includes an inner periphery side negative electrode active material layer 22B1 and an outer periphery side negative electrode active material layer 22B2, as the negative electrode active material layers 22B. The inner periphery side negative electrode active material layer 22B1 covers a portion or all of the inner peripheral surface 22A1 of the negative electrode current collector 22A. The outer periphery side negative electrode active material layer 22B2 covers a portion or all of the outer peripheral surface 22A2 of the negative electrode current collector 22A. In this specification, the inner periphery side negative electrode active material layer 22B1 and the outer periphery side negative electrode active material layer 22B2 may each be generically referred to as the negative electrode active material layer 22B, without being distinguished from each other.

As illustrated in FIGS. 3A and 3B, the inner periphery side negative electrode active material layer 22B1 may be provided in a region other than a region that overlaps with the inner periphery side edge 21E1 of the inner periphery side positive electrode active material layer 21B1 in a radial direction of the wound electrode body 20. For example, as indicated by an arrow in FIG. 3B, the inner periphery side negative electrode active material layer 22B1 may be absent at a location Y22 corresponding to the inner periphery side edge 21E1 in the radial direction of the wound electrode body 20. In an embodiment illustrated in FIGS. 3A and 3B, the inner periphery side negative electrode active material layer 22B1 may be provided in a winding portion of the wound electrode body 20 in a second and subsequent winds from the winding center of the wound electrode body 20. For example, as indicated by a broken line, the inner periphery side negative electrode active material layer 22B1 may be absent in the innermost wind portion 22*in* of the negative electrode 22 included in the wound electrode body 20. Thus, an inner periphery side edge of the outer periphery side negative electrode active material layer 22B2 is located on the inner side relative to an inner periphery side edge of the inner periphery side negative electrode active material layer 22B1, that is, located closer to the central axis of the wound electrode body 20 than the inner periphery side edge of the inner periphery side negative electrode active material layer 22B1. The inner periphery side negative electrode active material layer 22B1 may be provided, on the inner peripheral surface 22A1 of the negative electrode current collector 22A, at a location opposed to the outer periphery side positive electrode active material layer 21B2. The outer periphery side negative electrode active material layer 22B2 may be provided, on the outer peripheral surface 22A2 of the negative electrode current collector 22A, at a location opposed to the inner periphery side positive electrode active material layer 21B1.

The negative electrode 22 may include a negative electrode covered part 221 in which the negative electrode current collector 22A is covered with the negative electrode active material layer 22B, and a negative electrode exposed part 222 in which the negative electrode current collector 22A is exposed without being covered with the negative electrode active material layer 22B. As illustrated in FIG. 5A, the negative electrode covered part 221 and the negative electrode exposed part 222 may each extend along the L-axis direction, i.e., the longitudinal direction of the negative electrode 22. The negative electrode exposed part 222 may extend from an inner periphery side edge 22E1 of the negative electrode 22 to an outer periphery side edge 22E2 of the negative electrode 22 in the winding direction of the wound electrode body 20. In contrast, the negative electrode covered part 221 may be provided at neither the inner periphery side edge 22E1 of the negative electrode 22 nor the outer periphery side edge 22E2 of the negative electrode 22. As illustrated in FIG. 5A, portions of the negative electrode exposed part 222 may be provided to sandwich the negative electrode covered part 221 in the L-axis direction, i.e., the longitudinal direction of the negative electrode 22. For example, the negative electrode exposed part 222 may include a first portion 222A, a second portion 222B, and a third portion 222C. The first portion 222A may be provided to be adjacent to the negative electrode covered part 221 in the W-axis direction, and may extend in the L-axis direction from the inner periphery side edge 22E1 of the negative electrode 22 to the outer periphery side edge 22E2 of the negative electrode 22. The second portion 222B and the third portion 222C may be provided to sandwich the negative electrode covered part 221 in the L-axis direction. For example, the second portion 222B may be located in the vicinity of the inner periphery side edge 22E1 of the negative electrode 22, and the third portion 222C may be located in the vicinity of the outer periphery side edge 22E2 of the negative electrode 22. Note that the negative electrode exposed part 222 may have a second edge part 222E coupled to the negative electrode current collector plate 25, as illustrated in FIG. 1. A detailed configuration of the negative electrode 22 will be described later.

In the stack S20 in the wound electrode body 20, the positive electrode 21 and the negative electrode 22 are stacked with the separator 23 interposed therebetween. The positive electrode 21 and the negative electrode 22 may be stacked to cause the positive electrode exposed part 212 and the first portion 222A of the negative electrode exposed part 222 to face toward mutually opposite directions along the W-axis direction, i.e., a width direction. In the wound electrode body 20, an end part of the separator 23 may be fixed by attaching a fixing tape 46 to a side surface part 45 of the wound electrode body 20 to thereby prevent loosening of the winding.

In an embodiment, as illustrated in FIG. 2, the secondary battery 1 may satisfy A>B, where A represents a width of the positive electrode exposed part 212, and B represents a width of the first portion 222A of the negative electrode exposed part 222. For example, when the width A is 7 (mm), the width B may be 4 (mm). In an embodiment, the secondary battery 1 may satisfy C>D, where C represents a width of a portion of the positive electrode exposed part 212 protruding from an outer edge in the width direction of the separator 23, and D represents a width of a portion of the first portion 222A of the negative electrode exposed part 222 protruding from an opposite outer edge in the width direction of the separator 23. For example, when the width C is 4.5 (mm), the width D may be 3 (mm).

In the upper part of the secondary battery 1, as illustrated in FIG. 1, the positive electrode exposed part 212 as wound around the central axis CL may have a plurality of first edge parts 212E adjacent to each other in the radial direction (an R direction) of the wound electrode body 20, and the first edge parts 212E may be so bent toward the central axis CL as to overlap with each other. Similarly, in the lower part of the secondary battery 1, the negative electrode exposed part 222 as wound around the central axis CL may have a plurality of second edge parts 222E adjacent to each other in the radial direction (the R direction) of the wound electrode body 20, and the second edge parts 222E may be so bent toward the central axis CL as to overlap with each other. Thus, the first edge parts 212E of the positive electrode exposed part 212 may gather on an end face 41 of the wound electrode body 20 in the upper part, and the second edge parts 222E of the negative electrode exposed part 222 may gather on an end face 42 of the wound electrode body 20 in the lower part. To achieve better contact between the positive electrode current collector plate 24 for extracting a current and the first edge parts 212E, the first edge parts 212E bent toward the central axis CL may form a flat surface. Similarly, to achieve better contact between the negative electrode current collector plate 25 for extracting a current and the second edge parts 222E, the second edge parts 222E bent toward the central axis CL may form a flat surface. As used herein, the term "flat surface" may encompass not only a completely flat surface but also a surface having some asperities or surface roughness to the extent that joining of the positive electrode exposed part 212 to the positive electrode current collector plate 24 and joining of the negative electrode exposed part 222 to the negative electrode current collector plate 25 are possible.

The positive electrode current collector 21A may include an aluminum foil, for example, as will be described later. The negative electrode current collector 22A may include a copper foil, for example, as will be described later. In this case, the positive electrode current collector 21A may be softer than the negative electrode current collector 22A. In other words, the positive electrode exposed part 212 may be lower in Young's modulus than the negative electrode exposed part 222. Accordingly, in an embodiment, the widths A to D may satisfy the following relationship: A>B and C>D. In such a case, when the positive electrode exposed part 212 and the negative electrode exposed part 222 are simultaneously bent with equal pressures from both electrode sides, a height of the bent portion in the positive electrode 21 as measured from an end of the separator 23 and a height of the bent portion in the negative electrode 22 as measured from an end of the separator 23 may be substantially equal. In such a case, the first edge parts 212E (FIG. 1) of the positive electrode exposed part 212 may appropriately overlap with each other when bent. This makes it easy to perform joining of the positive electrode exposed part 212 and the positive electrode current collector plate 24 to each other. Similarly, the second edge parts 222E (FIG. 1) of the negative electrode exposed part 222 may appropriately overlap with each other when bent. This makes it easy to perform joining of the negative electrode exposed part 222 and the negative electrode current collector plate 25 to each other. As used herein, the "joining" refers to coupling by, for example, laser welding; however, a method of joining is not limited to laser welding.

As illustrated in FIG. 2, a portion of the positive electrode exposed part 212 of the positive electrode 21 that is opposed to the negative electrode 22 with the separator 23 interposed therebetween may be covered with the insulating layer 101. The insulating layer 101 may have a width of, for example, 3 mm in the W-axis direction. The insulating layer 101 may cover all of a region of the positive electrode exposed part 212 of the positive electrode 21 that is opposed to the negative electrode covered part 221 of the negative electrode 22 with the separator 23 interposed therebetween. The insulating layer 101 helps to effectively prevent an internal short circuit of the secondary battery 1 when foreign matter enters between the negative electrode covered part 221 and the positive electrode exposed part 212, for example. Further, when the secondary battery 1 undergoes an impact, the insulating layer 101 may absorb the impact, thereby helping to effectively prevent bending of the positive electrode exposed part 212 and a short circuit between the positive electrode exposed part 212 and the negative electrode 22.

The secondary battery 1 may further include insulating tapes 53 and 54 in a gap between the outer package can 11 and the wound electrode body 20. The positive electrode exposed part 212 having portions gathering on the end face 41 and the negative electrode exposed part 222 having portions gathering on the end face 42 may each be a conductor such as an exposed metal foil. Accordingly, if the positive electrode exposed part 212 and the negative electrode exposed part 222 are in close proximity to the outer package can 11, a short circuit between the positive electrode 21 and the negative electrode 22 can occur via the outer package can 11. A short circuit can also occur when the positive electrode current collector plate 24 on the end face 41 and the outer package can 11 are in close proximity to each other. To address this, the insulating tapes 53 and 54 may be provided as insulating members. The insulating tapes 53 and 54 may each be an adhesive tape including a base layer, and an adhesive layer provided on one surface of the base layer. The base layer may include any of polypropylene, polyethylene terephthalate, and polyimide, for example. To prevent the provision of the insulating tapes 53 and 54 from resulting in a decreased capacity of the wound electrode body 20, the insulating tapes 53 and 54 may be disposed not to overlap with the fixing tape 46 attached to the side surface part 45, and may each have a thickness smaller than or equal to a thickness of the fixing tape 46.

Figure 6A:
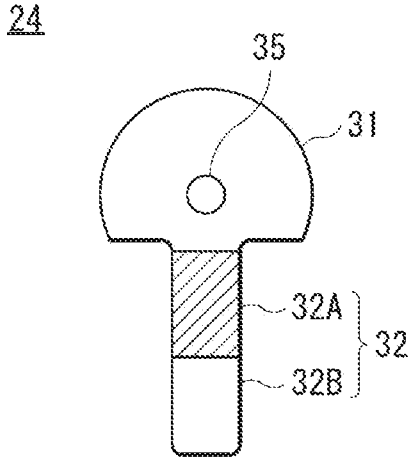
FIG. 6A is a plan view of a positive electrode current collector plate illustrated in FIG. 1.
Figure 6B:
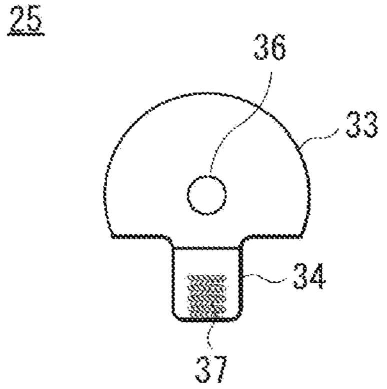
FIG. 6B is a plan view of a negative electrode current collector plate illustrated in FIG. 1.

In a typical lithium-ion secondary battery, for example, a lead for current extraction is welded at one location on each of the positive electrode and the negative electrode. However, this would result in a high internal resistance of the lithium-ion secondary battery and cause the lithium-ion secondary battery to generate heat and become hot during discharging. Thus, such a configuration would be unsuitable for high-rate discharging. To address this, in the secondary battery 1 according to an embodiment, the positive electrode current collector plate 24 may be disposed to face the end face 41 and the negative electrode current collector plate 25 may be disposed to face the end face 42. In addition, the positive electrode exposed part 212 located on the end face 41 and the positive electrode current collector plate 24 may be welded to each other at multiple points; and the negative electrode exposed part 222 located on the end face 42 and the negative electrode current collector plate 25 may be welded to each other at multiple points. A reduced internal resistance of the secondary battery 1 is achieved by employing such a configuration. In an embodiment, the end faces 41 and 42 may each be a flat surface, as described above. This also contributes to the reduction in resistance. The positive electrode current collector plate 24 may be electrically coupled to the battery cover 14 with the safety valve mechanism 30 interposed therebetween, for example. The negative electrode current collector plate 25 may be electrically coupled to the outer package can 11, for example. FIG. 6A is a schematic diagram illustrating a configuration example of the positive electrode current collector plate 24. FIG. 6B is a schematic diagram illustrating a configuration example of the negative electrode current collector plate 25. The positive electrode current collector plate 24 may be a metal plate including, for example, a simple substance or a composite material of aluminum or an aluminum alloy. The negative electrode current collector plate 25 may be a metal plate including, for example, a simple substance of nickel, a nickel alloy, copper, or a copper alloy, or a composite material of two or more thereof.

As illustrated in FIG. 6A, the positive electrode current collector plate 24 may have a shape in which a band-shaped part 32 having a substantially rectangular shape is coupled to a fan-shaped part 31 having a substantially fan shape. The fan-shaped part 31 may have a through hole 35 in the vicinity of a middle thereof. In the secondary battery 1, the positive electrode current collector plate 24 may be provided to allow the through hole 35 to overlap with the through hole 26 in the Z-axis direction. A hatched portion in FIG. 6A represents an insulating part 32A of the band-shaped part 32. The insulating part 32A may be a portion of the band-shaped part 32 and may have an insulating tape attached thereto or an insulating material applied thereto. A portion of the band-shaped part 32 below the insulating part 32A may be a coupling part 32B to be coupled to a sealing plate that also serves as an external terminal. Note that when the secondary battery 1 has a battery structure without a metallic center pin in the through hole 26 as illustrated in FIG. 1, there is a low possibility that the band-shaped part 32 will come into contact with a region of a negative electrode potential. In such a case, the positive electrode current collector plate 24 does not have to include the insulating part 32A. When the positive electrode current collector plate 24 does not include the insulating part 32A, it is possible to increase charge and discharge capacities by increasing a width of an overlap portion between the positive electrode 21 and the negative electrode 22 by an amount corresponding to a thickness of the insulating part 32A.

The negative electrode current collector plate 25 illustrated in FIG. 6B may have a shape similar to the shape of the positive electrode current collector plate 24 illustrated in FIG. 6A. However, the negative electrode current collector plate 25 may have a band-shaped part 34 different from the band-shaped part 32 of the positive electrode current collector plate 24. The band-shaped part 34 of the negative electrode current collector plate 25 may be shorter than the band-shaped part 32 of the positive electrode current collector plate 24, and may include no portion corresponding to the insulating part 32A of the positive electrode current collector plate 24. The band-shaped part 34 may be provided with circular projections 37 depicted as multiple circles. Upon resistance welding, a current may be concentrated on the projections 37, causing the projections 37 to melt to cause the band-shaped part 34 to be welded to a bottom of the outer package can 11. As with the positive electrode current collector plate 24, the negative electrode current collector plate 25 may have a through hole 36 in the vicinity of a middle of a fan-shaped part 33. In the secondary battery 1, the negative electrode current collector plate 25 may be provided to allow the through hole 36 to overlap with the through hole 26 in the Z-axis direction.

The fan-shaped part 31 of the positive electrode current collector plate 24 may, owing to a plan shape thereof, cover only a portion of the end face 41. Similarly, the fan-shaped part 33 of the negative electrode current collector plate 25 may, owing to a plan shape thereof, cover only a portion of the end face 42. The fan-shaped parts 31 and 33 may thus be adapted not to cover all of the end faces 41 and 42, respectively. One reason for this is that this may allow the electrolytic solution to smoothly permeate the wound electrode body 20 in assembling the secondary battery 1, for example. Another reason is that this may allow a gas generated when the secondary battery 1 comes into an abnormally hot state or an overcharged state to be easily released to the outside.

The positive electrode current collector 21A may include, for example, an electrically conductive material such as aluminum. The positive electrode current collector 21A may be a metal foil including aluminum or an aluminum alloy, for example.

The positive electrode active material layer 21B may include any one or more of positive electrode materials into which lithium is insertable and from which lithium is extractable, as one or more positive electrode active materials. Note that the positive electrode active material layer 21B may further include any one or more of other materials including, without limitation, a positive electrode binder and a positive electrode conductor. In an embodiment, the positive electrode material may be a lithium-containing compound. In an embodiment, the positive electrode material may be any of lithium-containing compounds including, without limitation, a lithium-containing composite oxide and a lithium-containing phosphoric acid compound. The lithium-containing composite oxide may be an oxide including lithium and one or more of other elements, that is, one or more of elements other than lithium, as constituent elements. The lithium-containing composite oxide may have any of crystal structures including, without limitation, a layered rock-salt crystal structure and a spinel crystal structure, for example. The lithium-containing phosphoric acid compound may be a phosphoric acid compound including lithium and one or more of other elements as constituent elements, and may have an olivine crystal structure, for example. In an embodiment, the positive electrode active material layer 21B may include, as the positive electrode active material, at least one of lithium cobalt oxide, lithium nickel cobalt manganese oxide, or lithium nickel cobalt aluminum oxide. The positive electrode binder may include, for example, any one or more of materials including, without limitation, a synthetic rubber and a polymer compound. Non-limiting examples of the synthetic rubber may include a styrene-butadiene-based rubber, a fluorine-based rubber, and ethylene propylene diene. Non-limiting examples of the polymer compound may include polyvinylidene difluoride and polyimide. The positive electrode conductor may include, for example, any one or more of materials including, without limitation, a carbon material. Non-limiting examples of the carbon material may include graphite, carbon black, acetylene black, and Ketjen black. Note that the positive electrode conductor may be any of electrically conductive materials including, without limitation, a metal material and an electrically conductive polymer.

The negative electrode current collector 22A may include, for example, an electrically conductive material such as copper. The negative electrode current collector 22A may be a metal foil including, for example, nickel, a nickel alloy, copper, or a copper alloy. In one example embodiment, the negative electrode current collector 22A may have a roughened surface. One reason for this is that adherence of the negative electrode active material layer 22B to the negative electrode current collector 22A may be improved by what is called an anchor effect. In such a case, the surface of the negative electrode current collector 22A may be roughened at least in a region opposed to the negative electrode active material layer 22B. Non-limiting examples of a method of roughening may include a method that forms fine particles through the use of an electrolytic treatment, for example. In the electrolytic treatment, fine particles may be formed on the surface of the negative electrode current collector 22A by an electrolytic method in an electrolyzer. This may provide asperities on the surface of the negative electrode current collector 22A. A copper foil produced by an electrolytic method may be generally called an electrolytic copper foil.

The negative electrode active material layer 22B may include any one or more of negative electrode materials into which lithium is insertable and from which lithium is extractable, as one or more negative electrode active materials. Note that the negative electrode active material layer 22B may further include any one or more of other materials including, without limitation, a negative electrode binder and a negative electrode conductor. The negative electrode material may be a carbon material, for example. One reason for this is that the carbon material may exhibit very little change in crystal structure at the time of insertion and extraction of lithium, thus allowing a high energy density to be obtained stably. Another reason is that the carbon material may also serve as a negative electrode conductor, thus allowing for improvement in electrical conductivity of the negative electrode active material layer 22B. Non-limiting examples of the carbon material may include graphitizable carbon, non-graphitizable carbon, and graphite. In an embodiment, spacing of a (002) plane of the non-graphitizable carbon may be 0.37 nm or more. In an embodiment, spacing of a (002) plane of the graphite may be 0.34 nm or less. Further non-limiting examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body may be a resultant of firing or carbonizing a polymer compound such as a phenol resin or a furan resin at a freely chosen temperature. Other than the above, the carbon material may be low-crystalline carbon heat-treated at a temperature of about 1000° C. or lower, or may be amorphous carbon, for example. The carbon material may have any of a fibrous shape, a spherical shape, a granular shape, and a flaky shape. If an open-circuit voltage in a fully charged state, that is, a battery voltage, of the secondary battery 1 is 4.25 V or higher, the amount of extracted lithium per unit mass may increase as compared with when the open-circuit voltage in the fully charged state is 4.20 V, even with use of the same positive electrode active material. The amount of the positive electrode active material and the amount of the negative electrode active material may thus be adjusted in accordance with the amount of extracted lithium per unit mass. This makes it possible to obtain a high energy density.

The negative electrode active material layer 22B may include, as the negative electrode active material, a silicon-containing material including at least one of silicon, silicon oxide, a carbon-silicon compound, or a silicon alloy. The term "silicon-containing material" is a generic term for a material that includes silicon as a constituent element. The silicon-containing material may include only silicon as a constituent element. Note that only one kind of silicon-containing material may be used, or two or more kinds of silicon-containing materials may be used. The silicon-containing material may be able to form an alloy with lithium, and may be a simple substance of silicon, a silicon alloy, a silicon compound, a mixture of two or more thereof, or a material including one or more phases thereof. Further, the silicon-containing material may be crystalline or amorphous, or may include both of a crystalline portion and an amorphous portion. Note that the simple substance described here merely refers to a simple substance in a general sense. The simple substance may thus include a small amount of impurity. In other words, purity of the simple substance is not limited to 100%. The silicon alloy may include, as a constituent element or constituent elements other than silicon, for example, any one or more of elements including, without limitation, tin, nickel, copper, iron, cobalt, manganese, zinc, indium, silver, titanium, germanium, bismuth, antimony, and chromium. The silicon compound may include, as a constituent element or constituent elements other than silicon, for example, any one or more of elements including, without limitation, carbon and oxygen. The silicon compound may include, as a constituent element or constituent elements other than silicon, for example, any one or more of the series of constituent elements described above in relation to the silicon alloy. Non-limiting examples of the silicon alloy and the silicon compound may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_2N_2O$, and $SiO_v$ (where $0<v\leq 2$). It should be understood, however, that a range of "v" may be freely chosen, and may be, for example, $0.2<v<1.4$.

The separator 23 is interposed between the positive electrode 21 and the negative electrode 22. The separator 23 may allow lithium ions to pass therethrough while preventing a short circuit of a current due to contact between the positive electrode 21 and the negative electrode 22. The separator 23 may be one or more kinds of porous films including, without limitation, synthetic resins or ceramics, and may be a stacked film including two or more kinds of porous films. Non-limiting examples of the synthetic resins may include polytetrafluoroethylene, polypropylene, and polyethylene. The separator 23 may include a base that includes a single-layer polyolefin porous film including polyethylene. One reason for this is that such a single-layer film may allow for a favorable high output power characteristic, as compared with a stacked film. When the two bases of the separator 23, that is, the first separator member 23A and the second separator member 23B, each include a single-layer porous film including polyolefin, the porous film may have a thickness in a range from, for example, 10 μm to 15 μm both inclusive. An internal short circuit is sufficiently avoidable if the single-layer porous film including polyolefin has a thickness of 10 μm or more. A more favorable discharge capacity characteristic is achievable if the single-layer porous film including polyolefin has a thickness of 15 μm or less. In an embodiment, the porous film may have an area density within a range from 6.3 $g/m^2$ to 8.3 $g/m^2$ both inclusive, for example. An internal short circuit is sufficiently avoidable if the single-layer porous film including polyolefin has an area density of 6.3 $g/m^2$ or more. A more favorable discharge capacity characteristic is achievable if the single-layer porous film including polyolefin has an area density of 8.3 $g/m^2$ or less.

In one example, the separator 23 may include a base layer including the above-described porous film as the base, and a polymer compound layer provided on one of or each of both surfaces of the base layer. One reason for this is that this may improve adherence of the separator 23 to each of the positive electrode 21 and the negative electrode 22, thus allowing for suppression of distortion of the wound electrode body 20. This suppresses a decomposition reaction of the electrolytic solution, and also suppresses leakage of the electrolytic solution with which the base layer is impregnated. This helps to prevent resistance from easily increasing even upon repeated charging and discharging, and also suppresses swelling of the battery. The polymer compound layer may include a polymer compound such as polyvinylidene difluoride. One reason for this is that the polymer compound such as polyvinylidene difluoride has superior physical strength and is electrochemically stable. However, the polymer compound may be other than polyvinylidene difluoride. To form the polymer compound layer, for example, a solution including an organic solvent and the polymer compound dissolved therein may be applied on the base layer, following which the base layer may be dried. Note that the base layer may be immersed in the solution and thereafter the base layer may be dried. For example, the polymer compound layer may include one or more kinds of insulating particles such as inorganic particles. Non-limiting examples of the kind of the inorganic particles may include aluminum oxide and aluminum nitride.

The electrolytic solution may include a solvent and an electrolyte salt. Note that the electrolytic solution may further include any one or more of other materials, non-limiting examples of which may include an additive. The solvent may include any one or more of nonaqueous solvents including, without limitation, an organic solvent. An electrolytic solution including a nonaqueous solvent is what is called a nonaqueous electrolytic solution. The nonaqueous solvent may include, for example, a fluorine compound and a dinitrile compound. The fluorine compound may include, for example, at least one of fluorinated ethylene carbonate, trifluorocarbonate, trifluoroethyl methyl carbonate, a fluorinated carboxylic acid ester, or a fluorine ether. The nonaqueous solvent may further include any of nitrile compounds other than dinitrile compounds, such as at least one of a mononitrile compound or a trinitrile compound. In an embodiment, the dinitrile compound may include succinonitrile (SN). Note that the dinitrile compound is not limited to succinonitrile, and may be any of other dinitrile compounds including, without limitation, adiponitrile.

The electrolyte salt may include any one or more of salts including, without limitation, a lithium salt. Note that the electrolyte salt may include any salt other than the lithium salt, for example. The salt other than the lithium salt may be, for example, a salt of a light metal other than lithium. Non-limiting examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). In an embodiment, the lithium salt may be one or more of $LiPF_6$, $LiBF_4$, $LiClO_4$, or $LiAsF_6$. In an embodiment, the lithium salt may be $LiPF_6$. A content of the electrolyte salt is not particularly limited. In an embodiment, the content of the electrolyte salt may be in a range from 0.3 mol/kg to 3 mol/kg both inclusive with respect to the solvent. In an embodiment, when the electrolytic solution includes $LiPF_6$ as the electrolyte salt, a concentration of $LiPF_6$ in the electrolytic solution may be in a range from 1.25 mol/kg to 1.45 mol/kg both inclusive. One reason for this is that this may help to prevent cycle deterioration caused by consumption (decomposition) of the salt upon high-load and high-rate charging, and may thus improve a high-load cyclability characteristic. In an embodiment, when the electrolytic solution includes $LiBF_4$ in addition to $LiPF_6$ as the electrolyte salt, a concentration of $LiBF_4$ in the electrolytic solution may be in a range from 0.001 (wt %) to 0.1 (wt %) both inclusive. One reason for this is that this may help to more effectively prevent the cycle deterioration caused by consumption (decomposition) of the salt upon high-load and high-rate charging, and may thus further improve the high-load cyclability characteristic.

Figure 7:
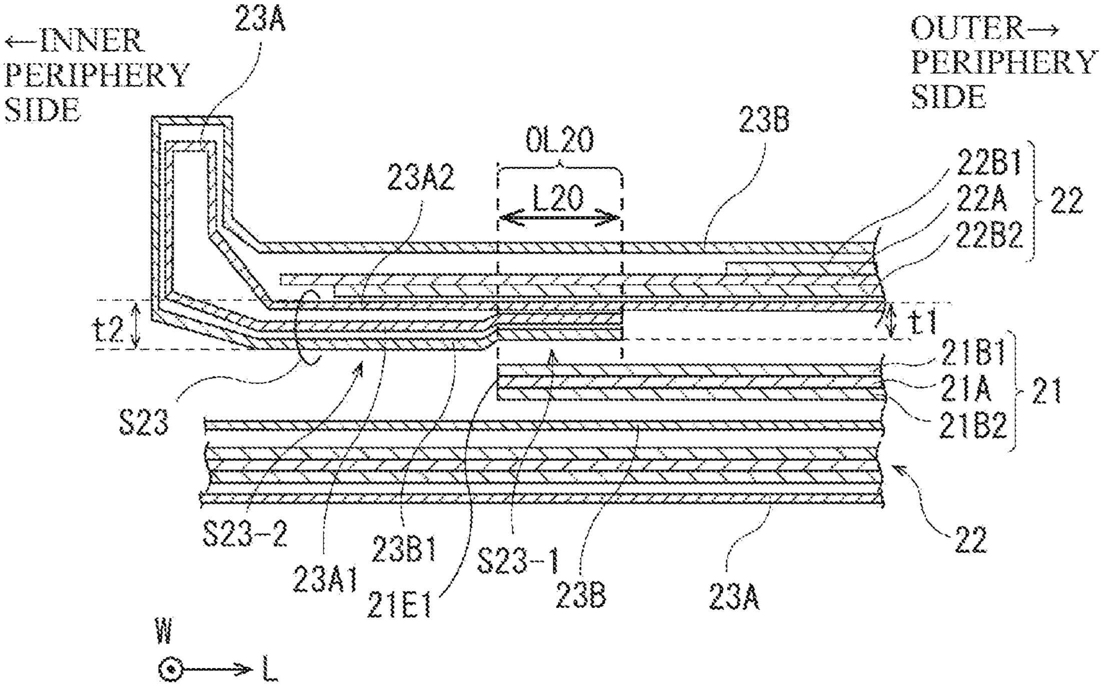
FIG. 7 is an enlarged schematic view of a vicinity of a center of the wound electrode body illustrated in FIG. 1.

Next, a detailed description is given of a positional relationship between the positive electrode 21, the negative electrode 22, and the separator 23 in the vicinity of the center of the wound electrode body 20 with reference to FIG. 7 in addition to FIG. 3B. FIG. 7 schematically illustrates the vicinity of the center of the wound electrode body 20 illustrated in FIG. 3B.

The separator 23 may include a stack part S23 including a stack of three or more base portions. In FIGS. 3B and 7, the stack part S23 may have a three-layer structure including a stack of the following three base portions: an inner periphery side end part 23A1 of the first separator member 23A; an intermediate portion 23A2 of the first separator member 23A; and an inner periphery side end part 23B1 of the second separator member 23B. Note that the stack part S23 may include a stack of four or more base portions.

In the wound electrode body 20, the inner periphery side edge 21E1 of the positive electrode 21, the negative electrode 22, and the stack part S23 may be located at positions corresponding to each other in the radial direction of the wound electrode body 20. Note that in FIG. 7, an up-and-down direction in the sheet plane may correspond to the radial direction of the wound electrode body 20. The first separator member 23A may be folded back in a center region of the wound electrode body 20. The center region of the wound electrode body 20 refers to a region of the wound electrode body 20 that is located on an inner periphery side, i.e., on a side in a negative direction of the L-axis, relative to an inner periphery side end part of the negative electrode current collector 22A in FIG. 7. The center region of the wound electrode body 20 further refers to a region of the wound electrode body 20 that is located on the inner periphery side relative to the inner periphery side end part of the negative electrode current collector 22A in FIG. 3A. Such a structure makes it possible for a folded-back portion of the first separator member 23A and a folded-back portion of the second separator member 23B to be firmly held on the winding core, thus making it possible to manufacture the wound electrode body 20 accurately in a short time. The inner periphery side end part 23A1 of the first separator member 23A that is folded back may be interposed between the inner periphery side edge 21E1 of the positive electrode 21 and the negative electrode 22. Similarly, the second separator member 23B may also be folded back in the center region of the wound electrode body 20. As with the inner periphery side end part 23A1, the inner periphery side end part 23B1 of the second separator member 23B that is folded back may also be interposed between the inner periphery side edge 21E1 of the positive electrode 21 and the negative electrode 22. Moreover, of the first separator member 23A, the intermediate portion 23A2 other than the inner periphery side end part 23A1 may also be interposed between the inner periphery side edge 21E1 of the positive electrode 21 and the negative electrode 22.

Here, an overlap portion OL20 in which the inner periphery side end part 23A1 of the first separator member 23A and the inner periphery side end part 23B1 of the second separator member 23B overlap with the positive electrode 21 may have a length L20 in the L-axis direction. In an embodiment, the length L20 may be 1 mm or more and shorter than a portion of the wound electrode body 20 corresponding to the innermost one wind. The length L20 of the overlap portion OL20 may be determined in the following manner, for example. First, the wound electrode body 20 may be taken out of the outer package can 11. Thereafter, the wound electrode body 20 in a wound state may be developed while keeping the state where the positive electrode 21, the first separator member 23A, the negative electrode 22, and the second separator member 23B are stacked in order. At this time, the wound electrode body 20 may be developed on a flat surface, with the positive electrode 21, the first separator member 23A, the negative electrode 22, and the second separator member 23B fastened together at some locations by means of, for example, clips, to prevent them from becoming misaligned with each other. Thereafter, the length L20 in the L-axis direction of the overlap portion OL20 may be measured by means of a ruler.

As illustrated in FIG. 7, the stack part S23 of the separator 23 may include a first portion S23-1 that is interposed between the positive electrode 21 and the negative electrode 22, and a second portion S23-2 that is not interposed between the positive electrode 21 and the negative electrode 22. The first portion S23-1 may have a thickness t1 smaller than a thickness t2 of the second portion S23-2, that is, t1<t2 may be satisfied. One reason for this is that when fabricating the wound electrode body 20 by winding the stack S20, the first portion S23-1 interposed between the innermost wind portion of the positive electrode 21 including the inner periphery side edge 21E1 and the innermost wind portion of the negative electrode 22 may be subjected to a higher pressure than the second portion S23-2 disposed in a region where the positive electrode 21 is absent. Note that in FIG. 7, for the sake of higher recognizability, the positive electrode 21, the negative electrode 22, the first separator member 23A, and the second separator member 23B are illustrated with spacing between every adjacent two of them; however, in actuality, every adjacent two of the positive electrode 21, the negative electrode 22, the first separator member 23A, and the second separator member 23B may be in contact with each other.

The thicknesses t1 and t2 of the stack part S23 of the separator 23 may be determined in the following manner, for example. First, the wound electrode body 20 may be taken out of the outer package can 11. Thereafter, the wound electrode body 20 in the wound state may be developed while keeping the state where the positive electrode 21, the first separator member 23A, the negative electrode 22, and the second separator member 23B are stacked in order. Thereafter, the stack part S23 may be cut along the L-axis direction at substantially a midpoint in the W-axis direction. Thereafter, a section resulting from the cutting may be cleaned by ion milling to thereby remove unwanted adherents, for example. Thereafter, the cleaned section may be observed with a scanning electron microscope to acquire an about 1000-fold magnified image, for example. From the magnified image acquired, thicknesses of the stack part S23 at positions 0.5-mm forward and 0.5-mm backward relative to a reference position along the L-axis direction may be measured, with a position of the inner periphery side edge 21E1 taken as the reference position. For example, a measurement position of the thickness t1 may be 0.5 mm away from the position of the inner periphery side edge 21E1 toward the outer periphery along the L-axis direction. A measurement position of the thickness t2 may be 0.5 mm away from the position of the inner periphery side edge 21E1 toward the inner periphery along the L-axis direction.

In the secondary battery 1 according to an embodiment, for example, upon the charging, lithium ions may be extracted from the positive electrode 21, and the extracted lithium ions may be inserted into the negative electrode 22 via the electrolytic solution. In the secondary battery 1, for example, upon the discharging, lithium ions may be extracted from the negative electrode 22, and the extracted lithium ions may be inserted into the positive electrode 21 via the electrolytic solution.

Figure 8:
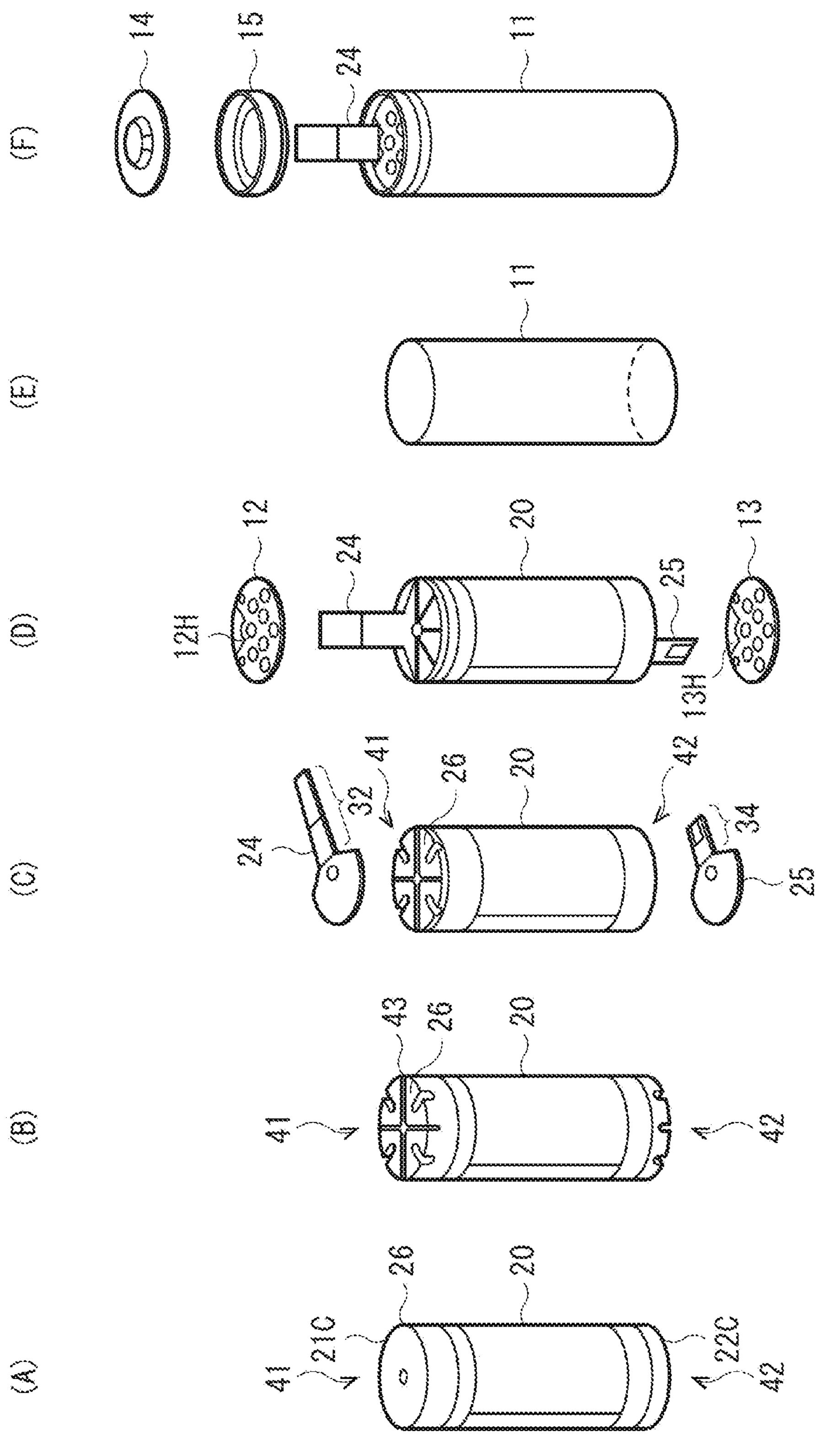
FIG. 8 is a perspective diagram describing a process of manufacturing the secondary battery illustrated in FIG. 1.

A method of manufacturing the secondary battery 1 will be described with reference to FIG. 8 as well as FIGS. 1 to 5B. FIG. 8 is a perspective diagram describing a process of manufacturing the secondary battery 1 illustrated in FIG. 1.

First, the positive electrode current collector 21A may be prepared and the positive electrode active material layer 21B may be selectively formed on the surface of the positive electrode current collector 21A to thereby form the positive electrode 21 including the positive electrode covered part 211 and the positive electrode exposed part 212. Thereafter, the negative electrode current collector 22A may be prepared and the negative electrode active material layer 22B may be selectively formed on the surface of the negative electrode current collector 22A to thereby form the negative electrode 22 including the negative electrode covered part 221 and the negative electrode exposed part 222. The positive electrode 21 and the negative electrode 22 may be subjected to a drying process. Thereafter, the stack S20 may be fabricated by stacking the positive electrode 21 and the negative electrode 22 with the first separator member 23A and the second separator member 23B interposed therebetween in such a manner that the positive electrode exposed part 212 and the first portion 222A of the negative electrode exposed part 222 are located on opposite sides in the W-axis direction. In fabricating the stack S20, the inner periphery side end part 23A1 of the first separator member 23A and the inner periphery side end part 23B1 of the second separator member 23B may be folded back to cause the inner periphery side end part 23A1 and the inner periphery side end part 23B1 to be interposed between the inner periphery side edge 21E1 of the positive electrode 21 and the negative electrode 22. Thereafter, the stack S20 may be so wound in a spiral shape as to form the through hole 26. Thereafter, the fixing tape 46 may be attached to an outermost wind of the stack S20 wound in the spiral shape. The wound electrode body 20 may thus be obtained as illustrated in part (A) of FIG. 8.

Thereafter, as illustrated in part (B) of FIG. 8, the end faces 41 and 42 of the wound electrode body 20 may be locally bent by pressing an end of a member such as a 0.5-mm-thick flat plate against each of the end faces 41 and 42 perpendicularly, that is, in the Z-axis direction. As a result, grooves 43 may be formed to extend radially in radial directions (R directions) from the through hole 26. Note that the number and arrangement of the grooves 43 illustrated in part (B) of FIG. 8 are merely one example, and embodiments of the present disclosure are not limited thereto.

Thereafter, as illustrated in part (C) of FIG. 8, substantially equal pressures may be applied to the end faces 41 and 42 substantially perpendicularly from above and below the wound electrode body 20 at substantially the same time. At this time, for example, a rod-shaped jig may have already been inserted into the through hole 26. By performing the above-described process, the positive electrode exposed part 212 and the first portion 222A of the negative electrode exposed part 222 may be bent to make the respective end faces 41 and 42 into flat surfaces. Here, the first edge parts 212E of the positive electrode exposed part 212 located on the end face 41 may be caused to bend toward the through hole 26 while overlapping with each other, and the second edge parts 222E of the negative electrode exposed part 222 located on the end face 42 may be caused to bend toward the through hole 26 while overlapping with each other. Thereafter, the fan-shaped part 31 of the positive electrode current collector plate 24 may be joined to the end face 41 by, for example, laser welding, and the fan-shaped part 33 of the negative electrode current collector plate 25 may be joined to the end face 42 by, for example, laser welding.

Thereafter, the insulating tapes 53 and 54 may be attached to predetermined locations on the wound electrode body 20. Thereafter, as illustrated in part (D) of FIG. 8, the band-shaped part 32 of the positive electrode current collector plate 24 may be bent and inserted into a hole 12H of the insulating plate 12. Further, the band-shaped part 34 of the negative electrode current collector plate 25 may be bent and inserted into a hole 13H of the insulating plate 13.

Thereafter, the wound electrode body 20 having been assembled in the above-described manner may be placed into the outer package can 11 illustrated in part (E) of FIG. 8, following which the bottom of the outer package can 11 and the negative electrode current collector plate 25 may be welded to each other. Thereafter, a narrow part may be formed in the vicinity of the open end part 11N of the outer package can 11. Thereafter, the electrolytic solution may be injected into the outer package can 11, following which the band-shaped part 32 of the positive electrode current collector plate 24 and the safety valve mechanism 30 may be welded to each other.

Thereafter, as illustrated in part (F) of FIG. 8, the outer package can 11 may be sealed with the gasket 15, the safety valve mechanism 30, and the battery cover 14, with use of the narrow part.

The secondary battery 1 according to an embodiment may be completed in the above-described manner.

In the secondary battery 1 according to an embodiment, as described above, the inner periphery side negative electrode active material layer 22B1 is not provided in the region, of the negative electrode 22, that overlaps with the inner periphery side edge 21E1 of the inner periphery side positive electrode active material layer 21B1. For example, the inner periphery side edge of the outer periphery side negative electrode active material layer 22B2 is located closer to the central axis of the wound electrode body 20 than the inner periphery side edge of the inner periphery side negative electrode active material layer 22B1. This makes it easier for the negative electrode 22 to change its shape to be closer to the winding center. Accordingly, even when expansion and contraction of the wound electrode body 20 occur in association with charging and discharging, spacing between the inner periphery side edge 21E1 of the inner periphery side positive electrode active material layer 21B1 and the negative electrode 22 increases to allow for mitigation of stress to be applied to the separator 23. This helps to avoid a short circuit between the positive electrode 21 and the negative electrode 22 caused by a tear of the separator 23. It is thus possible for the secondary battery 1 according to an embodiment to achieve high reliability.

In an embodiment, in the secondary battery 1, the inner periphery side negative electrode active material layer 22B1 may be provided in the winding portion of the wound electrode body 20 in the second and subsequent winds from the winding center of the wound electrode body 20. In such a case, a possibility of the short circuit between the positive electrode 21 and the negative electrode 22 is further reduced. This helps to achieve higher reliability.

In an embodiment, the inner periphery side negative electrode active material layer 22B1 may be provided, on the inner peripheral surface 22A1 of the negative electrode current collector 22A, at a location opposed to the outer periphery side positive electrode active material layer 21B2, and the outer periphery side negative electrode active material layer 22B2 may be provided, on the outer peripheral surface 22A2 of the negative electrode current collector 22A, at a location opposed to the inner periphery side positive electrode active material layer 21B1. This helps to avoid precipitation of lithium.

In an embodiment, in the secondary battery 1, the electrolytic solution may include $LiPF_6$ as the electrolyte salt, and the concentration of $LiPF_6$ in the electrolytic solution may be in the range from 1.25 mol/kg to 1.45 mol/kg both inclusive. If the concentration of the electrolyte salt is 1.25 mol/kg or more, a sufficient number of ion carriers are obtainable, which makes it possible to avoid an increase in resistance and to effectively reduce heat generation. If the concentration of the electrolyte salt is 1.45 mol/kg or less, it is possible to suppress an increase in viscosity of the electrolytic solution caused by the presence of the electrolyte salt, to keep favorable impregnability of the positive electrode 21 and the negative electrode 22 with the electrolytic solution, and to effectively reduce heat generation. This makes it possible for the secondary battery 1 to mitigate an internal temperature increase upon the charging, and to effectively suppress a decomposition reaction of the electrolytic solution. Accordingly, it is possible to prevent cycle deterioration caused by consumption (decomposition) of the salt upon high-load and high-rate charging, and a high-load cyclability characteristic is thus improved. This helps to achieve high reliability.

Examples of applications of the secondary battery 1 according to an embodiment of the present disclosure may be as described below.

Figure 9:
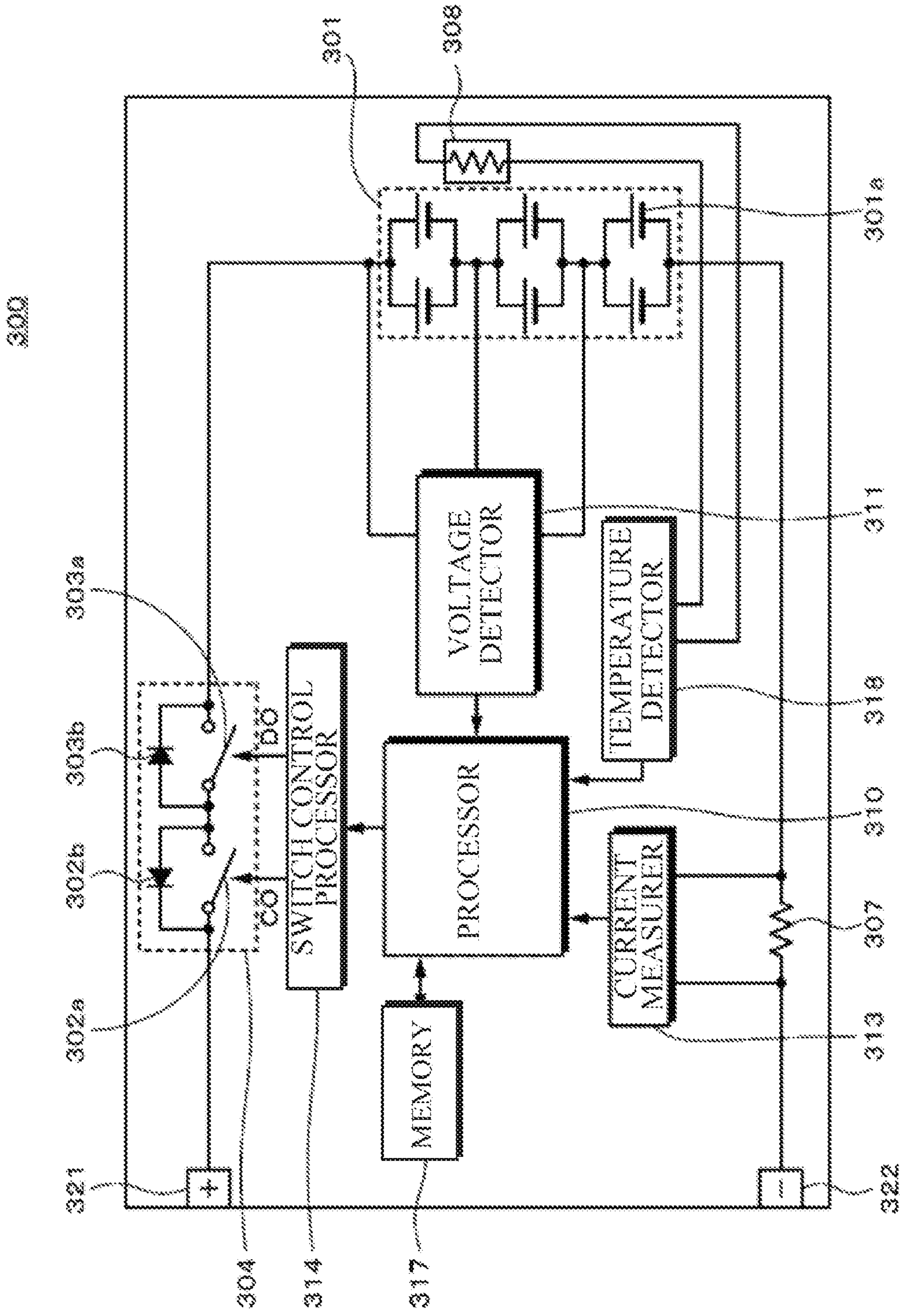
FIG. 9 is a block diagram illustrating a circuit configuration of a battery pack to which the secondary battery according to an embodiment of the present disclosure is applied.

FIG. 9 is a block diagram illustrating a circuit configuration example where a battery according to an embodiment of the present disclosure, which will hereinafter be referred to as a secondary battery as appropriate, is applied to a battery pack 300. The battery pack 300 may include an assembled battery 301, an outer package, a switcher 304, a current detection resistor 307, a temperature detection device 308, and a processor 310. The switcher 304 may include a charge control switch 302*a* and a discharge control switch 303*a*.

The battery pack 300 may include a positive electrode terminal 321 and a negative electrode terminal 322. Upon charging, the positive electrode terminal 321 and the negative electrode terminal 322 may be respectively coupled to a positive electrode terminal and a negative electrode terminal of a charger to perform charging. Upon use of electronic equipment, the positive electrode terminal 321 and the negative electrode terminal 322 may be respectively coupled to a positive electrode terminal and a negative electrode terminal of the electronic equipment to perform discharging.

The assembled battery 301 may include multiple secondary batteries 301*a* coupled in series or in parallel. The secondary battery 1 described above may be applied to each secondary battery 301*a*. Although FIG. 9 illustrates an example in which six secondary batteries 301*a* are coupled in a two parallel coupling and three series coupling (2P3S) configuration, this is non-limiting. The secondary batteries 301*a* may be coupled in any other manner such as in any n parallel coupling and m series coupling configuration, where n and m are integers.

The switcher 304 may include the charge control switch 302*a*, a diode 302*b*, the discharge control switch 303*a*, and a diode 303*b*. The switcher 304 may be controlled by the processor 310. The diode 302*b* may have a polarity that is in a reverse direction with respect to a charge current flowing in a direction from the positive electrode terminal 321 to the assembled battery 301, and in a forward direction with respect to a discharge current flowing in a direction from the negative electrode terminal 322 to the assembled battery 301. The diode 303*b* may have a polarity that is in the forward direction with respect to the charge current and in the reverse direction with respect to the discharge current. FIG. 9 illustrates an example in which the switcher 304 is provided on a positive side; however, the switcher 304 may be provided on a negative side.

The charge control switch 302*a* may be controlled by a charge and discharge control processor in such a manner that when a battery voltage reaches an overcharge detection voltage, the charge control switch 302*a* is turned off to thereby prevent the charge current from flowing through a current path of the assembled battery 301. After the charge control switch 302*a* is turned off, only discharging may be enabled through the diode 302*b*. Further, the charge control switch 302*a* may be controlled by the processor 310 in such a manner that when a large current flows upon charging, the charge control switch 302*a* is turned off to thereby cut off the charge current flowing through the current path of the assembled battery 301. The discharge control switch 303*a* may be controlled by the processor 310 in such a manner that when the battery voltage reaches an overdischarge detection voltage, the discharge control switch 303*a* is turned off to thereby prevent the discharge current from flowing through the current path of the assembled battery 301. After the discharge control switch 303*a* is turned off, only charging may be enabled through the diode 303*b*. Further, the discharge control switch 303*a* may be controlled by the processor 310 in such a manner that when a large current flows upon discharging, the discharge control switch 303*a* is turned off to thereby cut off the discharge current flowing through the current path of the assembled battery 301.

The temperature detection device 308 may be, for example, a thermistor. The temperature detection device 308 may be provided in the vicinity of the assembled battery 301, and may measure a temperature of the assembled battery 301 to supply the measured temperature to the processor 310. A voltage detector 311 may measure a voltage of the assembled battery 301 and a voltage of each of the secondary batteries 301*a* included in the assembled battery 301, and may perform A/D conversion on the measured voltages to supply the converted voltages to the processor 310. A current measurer 313 may measure a current by means of the current detection resistor 307, and may supply the measured current to the processor 310. A switch control processor 314 may control the charge control switch 302*a* and the discharge control switch 303*a* of the switcher 304 based on the voltages supplied from the voltage detector 311 and the current supplied from the current measurer 313.

When the voltage of any of the secondary batteries 301*a* equals or falls below the overcharge detection voltage or the overdischarge detection voltage, or when a large current flows suddenly, the switch control processor 314 may transmit a control signal to the switcher 304 to thereby prevent overcharging and overdischarging, or overcurrent charging and overcurrent discharging. For example, when the secondary battery is a lithium-ion secondary battery, the overcharge detection voltage may be determined to be, for example, 4.20 V±0.05 V, and the overdischarge detection voltage may be determined to be, for example, 2.4 V±0.1 V.

As the charge and discharge control switches, for example, semiconductor switches such as metal-oxide-semiconductor field-effect transistors (MOSFETs) may be used. In such a case, parasitic diodes of the MOSFETs may serve as the diodes 302*b* and 303*b*. When P-channel field-effect transistors (FETs) are used as the charge and discharge control switches, the switch control processor 314 may supply control signals DO and CO to respective gates of the charge control switch 302*a* and the discharge control switch 303*a*. When the charge control switch 302*a* and the discharge control switch 303*a* are of P-channel type, the charge control switch 302*a* and the discharge control switch 303*a* may be turned on by a gate potential that is lower than a source potential by a predetermined value or more. For example, in normal charging and discharging operations, the control signals CO and DO may be set to a low level to turn on the charge control switch 302*a* and the discharge control switch 303*a*.

For example, upon overcharging or overdischarging, the control signals CO and DO may be set to a high level to turn off the charge control switch 302*a* and the discharge control switch 303*a*.

A memory 317 may include a random access memory (RAM) and a read only memory (ROM). In an embodiment, the memory 317 may include an erasable programmable read only memory (EPROM) that is a nonvolatile memory. In the memory 317, various values including, for example, a numerical value calculated by the processor 310 and an internal resistance value of each of the secondary batteries 301*a* in an initial state thereof measured in the manufacturing process stage may be stored in advance, and may be rewritten on an as-needed basis. By storing a full charge capacity of the secondary battery 301*a* in the memory 317, it is possible to calculate, for example, a remaining capacity with the processor 310.

A temperature detector 318 may measure a temperature with use of the temperature detection device 308 to perform charge and discharge control upon abnormal heat generation, and to perform correction in calculating the remaining capacity.

The secondary battery according to an embodiment of the present disclosure may be mounted on or used to supply electric power to any of equipment including, without limitation, electronic equipment, an electric tool, an electric vehicle, an electric aircraft, and a power storage apparatus.

Non-limiting examples of the electronic equipment may include laptop personal computers, smartphones, tablet terminals, personal digital assistants (PDAs) (mobile information terminals), mobile phones, wearable terminals, cordless phone handsets, hand-held video recording and playback devices, digital still cameras, electronic books, electronic dictionaries, music players, radios, headphones, game machines, navigation systems, memory cards, pacemakers, hearing aids, electric shavers, refrigerators, air conditioners, televisions, stereos, water heaters, microwave ovens, dishwashers, washing machines, dryers, lighting equipment, toys, medical equipment, robots, road conditioners, and traffic lights.

Non-limiting examples of the electric vehicle may include railway vehicles, golf carts, electric carts, and electric automobiles including hybrid electric automobiles. The secondary battery according to an embodiment may be used as a driving power source or an auxiliary power source for any of these electric vehicles. Non-limiting examples of the power storage apparatuses may include a power storage power source for architectural structures including residential houses, or for power generation facilities.

EXAMPLES

A description is given of Examples according to an embodiment of the present disclosure.

Example 1

As described below, the secondary batteries 1 of the cylindrical type illustrated in, for example, FIG. 1 were fabricated, following which the secondary batteries 1 were each evaluated for a battery characteristic thereof. Here, fabricated were lithium-ion secondary batteries each having a diameter of 21 mm and a length of 70 mm.

[Fabrication Method]

First, an aluminum foil having a thickness of 12 μm was prepared as the positive electrode current collector 21A. Thereafter, as the positive electrode active material, a layered lithium oxide including lithium nickel cobalt aluminum oxide (NCA) having a Ni ratio of 85% or more was mixed with a positive electrode binder including polyvinylidene difluoride (PVDF) and a conductive additive including a mixture of carbon black, acetylene black, and Ketjen black to thereby obtain a positive electrode mixture. A mixture ratio between the positive electrode active material, the positive electrode binder, and the conductive additive was set to 96.4:2:1.6. Thereafter, the positive electrode mixture was put into an organic solvent (N-methyl-2-pyrrolidone), following which the organic solvent was stirred to thereby prepare a positive electrode mixture slurry in a paste form. Thereafter, the positive electrode mixture slurry was applied on respective predetermined regions on both surfaces of the positive electrode current collector 21A by means of a coating apparatus, following which the applied positive electrode mixture slurry was dried to thereby form the positive electrode active material layers 21B. Further, a coating material including PVDF was applied on a region, of each of both surfaces of the positive electrode exposed part 212, adjacent to the positive electrode covered part 211 and the applied coating material was dried to thereby form the insulating layers 101 each having a width of 3 mm and a thickness of 8 μm. Thereafter, the positive electrode active material layers 21B were compression-molded by means of a roll pressing machine. Thus, the positive electrode 21 including the positive electrode covered part 211 and the positive electrode exposed part 212 was obtained. Here, a width in the W-axis direction of the positive electrode covered part 211 was set to 60 mm, and a width in the W-axis direction of the positive electrode exposed part 212 was set to 7 mm. A length in the L-axis direction of the positive electrode 21 was set to 1700 mm. In the positive electrode 21 thus obtained, the positive electrode active material layers 21B had an area density of 22.0 $mg/cm^2$ and a volume density of 3.55 $g/cm^3$. The positive electrode covered part 211 had a thickness T1 of 74.3 μm.

A copper foil having a thickness of 81 μm was prepared as the negative electrode current collector 22A. Thereafter, the negative electrode active material including a mixture of a carbon material (including graphite) and SiO was mixed with a negative electrode binder including polyvinylidene difluoride and a conductive additive including a mixture of carbon black, acetylene black, and Ketjen black to thereby obtain a negative electrode mixture. A mixture ratio between the negative electrode active material, the negative electrode binder, and the conductive additive was set to 96.1:2.9:1.0. A mixture ratio between graphite and SiO in the negative electrode active material was set to 95:5. Thereafter, the negative electrode mixture was put into an organic solvent (N-methyl-2-pyrrolidone), following which the organic solvent was stirred to thereby prepare a negative electrode mixture slurry in a paste form. Thereafter, the negative electrode mixture slurry was applied on respective predetermined regions on both surfaces of the negative electrode current collector 22A by means of a coating apparatus, following which the applied negative electrode mixture slurry was dried to thereby form the negative electrode active material layers 22B. Thereafter, the negative electrode active material layers 22B were compression-molded by means of a roll pressing machine. Thus, the negative electrode 22 including the negative electrode covered part 221 and the negative electrode exposed part 222 was obtained. Here, a width in the W-axis direction of the negative electrode covered part 221 was set to 62 mm, and a width in the W-axis direction of the first portion 222A of the negative electrode exposed part 222 was set to 4 mm. A length in the L-axis direction of the negative electrode 22 was set to 1760 mm. In the negative electrode 22 obtained, the negative electrode active material layers 22B had an area density of 10.83 mg/cm' and a volume density of 1.65 $g/cm^3$. The negative electrode covered part 221 had a thickness of 80.2 μm. The inner periphery side negative electrode active material layer 22B1 was selectively formed on a portion of the inner peripheral surface 22A1 of the negative electrode current collector 22A to allow the inner periphery side negative electrode active material layer 22B1 to be present in the winding portion of the wound electrode body 20 in the second and subsequent winds from the winding center of the wound electrode body 20.

Thereafter, the stack S20 was fabricated by stacking the positive electrode 21 and the negative electrode 22 with the first separator member 23A and the second separator member 23B interposed therebetween in such a manner that the positive electrode exposed part 212 and the first portion 222A of the negative electrode exposed part 222 were located on opposite sides in the W-axis direction. At this time, the stack S20 was fabricated not to allow the positive electrode active material layers 21B to extend off the negative electrode active material layers 22B in the W-axis direction. As each of the first separator member 23A and the second separator member 23B, a polyethylene sheet having a width of 65 mm and a thickness of 14 μm was used. In fabricating the stack S20, the inner periphery side end part 23A1 of the first separator member 23A and the inner periphery side end part 23B1 of the second separator member 23B were folded back to cause the inner periphery side end part 23A1 and the inner periphery side end part 23B1 to be interposed between the inner periphery side edge 21E1 of the positive electrode 21 and the negative electrode 22. The length L20 of the overlap portion OL20 was adjusted to 1 mm. Thereafter, the stack S20 was wound in a spiral shape to allow for formation of the through hole 26 and to allow a cutout to be located in the vicinity of the central axis CL, and the fixing tape 46 was attached to the outermost wind of the stack S20 thus wound. The wound electrode body 20 was thereby obtained.

Thereafter, the end faces 41 and 42 of the wound electrode body 20 were locally bent by pressing an end of a 0.5-mm-thick flat plate against each of the end faces 41 and 42 in the Z-axis direction. The grooves 43 extending radiantly in the radial directions (the R directions) from the through hole 26 were thereby formed.

Thereafter, substantially equal pressures were applied to the end faces 41 and 42 substantially perpendicularly from above and below the wound electrode body 20 at substantially the same time. The positive electrode exposed part 212 and the first portion 222A of the negative electrode exposed part 222 were thereby bent to make the end faces 41 and 42 into flat surfaces. At this time, the first edge parts 212E of the positive electrode exposed part 212 located on the end face 41 were caused to bend toward the through hole 26 while overlapping with each other, and the second edge parts 222E of the negative electrode exposed part 222 located on the end face 42 were caused to bend toward the through hole 26 while overlapping with each other. Thereafter, the fan-shaped part 31 of the positive electrode current collector plate 24 was joined to the end face 41 by laser welding, and the fan-shaped part 33 of the negative electrode current collector plate 25 was joined to the end face 42 by laser welding.

Thereafter, the insulating tapes 53 and 54 were attached to predetermined locations on the wound electrode body 20, following which the band-shaped part 32 of the positive electrode current collector plate 24 was bent and inserted into the hole 12H of the insulating plate 12, and the band-shaped part 34 of the negative electrode current collector plate 25 was bent and inserted into the hole 13H of the insulating plate 13.

Thereafter, the wound electrode body 20 having been assembled in the above-described manner was placed into the outer package can 11, following which the bottom of the outer package can 11 and the negative electrode current collector plate 25 were welded to each other. Thereafter, the narrow part was formed in the vicinity of the open end part 11N of the outer package can 11. Thereafter, the electrolytic solution was injected into the outer package can 11, following which the band-shaped part 32 of the positive electrode current collector plate 24 and the safety valve mechanism 30 were welded to each other.

Used as the electrolytic solution was a solution including ethylene carbonate (EC) and dimethyl carbonate (DMC) as a first solvent, fluoroethylene carbonate (FEC) and succinonitrile (SN) as a second solvent added to the first solvent, and $LiBF_4$ and $LiPF_6$ as the electrolyte salt. In the lithium-ion secondary battery of each Example, a content ratio (wt %) between EC, DMC, FEC, SN, $LiBF_4$, and $LiPF_6$ in the electrolytic solution was set to 12.7:56.2:12.0:1.0:1.0:17.1.

Thereafter, the outer package can 11 was sealed with the gasket 15, the safety valve mechanism 30, and the battery cover 14, with use of the narrow part.

The secondary battery 1 of Example 1 was thus obtained.

Evaluation of a battery characteristic of the secondary battery 1 of Example 1 revealed the results presented in Table 1. The number of samples n of Example 1 was set to 100. Specifically, a cycling test was performed under the following test conditions, following which a cycle capacity retention rate and the occurrence of a short circuit inside the secondary battery 1 were investigated. Whether the short circuit occurred was determined by measuring, over a period of 48 hours, the open circuit voltage (OCV) after the cycling test. If there was a voltage drop of 150 mV or more from an initial voltage, it was determined that a short circuit occurred.

The test conditions of the cycling test were as follows.

[Cycling Test Conditions]

(1) Ambient temperature at which the test was performed: 23° C.

(2) Charge conditions: Charging with a constant current and a constant voltage (CC-CV) was performed. The secondary battery 1 was charged with a constant current of 6 A until a voltage reached 4.2 V, and was thereafter charged with a constant voltage of 4.2 V. A cutoff current was set to 1 A.

(3) Rest time after charging: 30 minutes (4) Discharge conditions: Constant current (CC) discharging was performed with a constant current of 40 A. A cutoff voltage was set to 2.5 V, or discharging was stopped when a temperature reached 85° C.

(5) Rest after discharging: A rest was taken until a surface temperature of the battery fell below 30° C.

(6) Number of cycles: 500

Further, a discharge test was performed on the secondary battery 1 of Example 1 under the following test conditions to measure a discharge capacity [mAh]. The test conditions of the discharge test were as follows.

[Discharge Test Conditions]

(1) Ambient temperature at which the test was performed: 23° C.

(2) Charge conditions: Charging with a constant current and a constant voltage (CC-CV) was performed. The secondary battery 1 was charged with a constant current of 2.5 A until a voltage reached 4.2 V, and was thereafter charged with a constant voltage of 4.2 V. The cutoff current was set to 0.05 A.

(3) Rest time after charging: 30 minutes (4) Discharge conditions: Constant current (CC) discharging was performed with a constant current of 0.5 A. The cutoff voltage was set to 2.5 V.

TABLE 1

| | Volume density [g/cm$^3$] of negative electrode active material layer | Inner periphery side negative electrode active material layer in innermost wind | Folded-back portion of separator | Discharge current [A] | 0.2 C discharge capacity [mAh] | Cycle capacity retention rate [%] | Number of occurrences of internal short circuit |
|---|---|---|---|---|---|---|---|
| Example 1 | 1.65 | Absent | Present | 40 | 3000 | 50 | 0/100 |
| Example 2 | 1.65 | Absent | Present | 50 | 3000 | 25 | 0/100 |
| Example 3 | 1.65 | Absent | Absent | 40 | 3000 | 50 | 0/100 |
| Example 4 | 1.45 | Absent | Present | 40 | 3000 | 60 | 0/100 |

TABLE 1-continued

| | Volume density [g/cm³] of negative electrode active material layer | Inner periphery side negative electrode active material layer in innermost wind | Folded-back portion of separator | Discharge current [A] | 0.2 C discharge capacity [mAh] | Cycle capacity retention rate [%] | Number of occurrences of internal short circuit |
|---|---|---|---|---|---|---|---|
| Example 5 | 1.85 | Absent | Present | 40 | 3000 | 45 | 0/100 |
| Comparative example 1 | 1.65 | Present | Present | 40 | 3000 | 50 | 5/100 |
| Comparative example 2 | 1.65 | Present | Present | 50 | 3000 | 25 | 10/100 |
| Comparative example 3 | 1.65 | Present | Absent | 40 | 3000 | 50 | 10/100 |
| Comparative example 4 | 1.45 | Present | Present | 40 | 3000 | 60 | 1/100 |
| Comparative example 5 | 1.85 | Present | Present | 40 | 3000 | 45 | 8/100 |

Example 2

The secondary battery 1 of Example 2 was fabricated in a manner similar to that in Example 1 and was subjected to a battery characteristic evaluation similar to that on Example 1 except that the discharge current in the above-described cycling test conditions was set to 50 A. The number of samples n of Example 2 was set to 100. The results are also presented in Table 1.

Example 3

Figure 10:
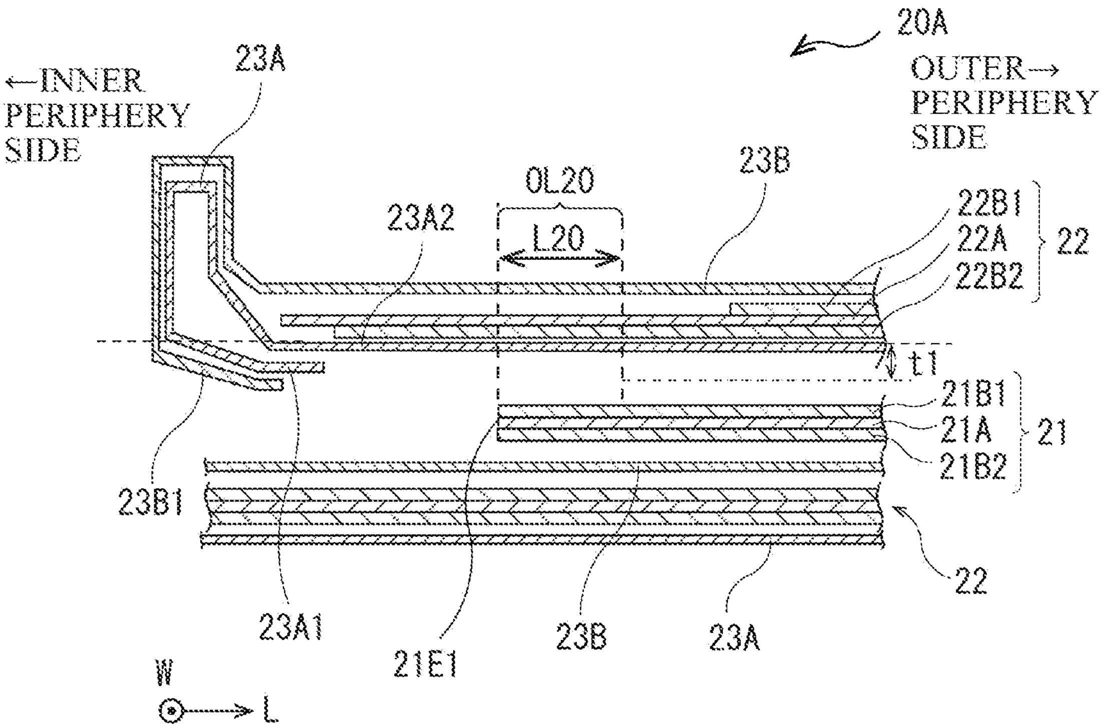
FIG. 10 is an enlarged schematic view of a vicinity of a center of a wound electrode body of Example 3.

As Example 3, a lithium-ion secondary battery including a wound electrode body 20A illustrated in FIG. 10 was fabricated. The number of samples n of Example 3 was set to 100. For the lithium-ion secondary battery of Example 3, when fabricating the wound electrode body 20A, as illustrated in FIG. 10, neither of the inner periphery side end part 23A1 of the first separator member 23A and the inner periphery side end part 23B1 of the second separator member 23B that were folded back was allowed to reach the inner periphery side edge 21E1 of the positive electrode 21. In other words, neither of the inner periphery side end part 23A1 and the inner periphery side end part 23B1 was allowed to be present between the inner periphery side edge 21E1 of the positive electrode 21 and the negative electrode 22. Except for the above-described difference, the lithium-ion secondary battery of Example 3 had a configuration similar to that of the secondary battery 1 of Example 1. The lithium-ion secondary battery of Example 3 was also subjected to a battery characteristic evaluation similar to that on Example 1. The results are also presented in Table 1.

Examples 4 and 5

The secondary batteries 1 of Examples 4 and 5 were fabricated in a manner similar to that in Example 1 except that the volume densities of the negative electrode active material layers 22B in Examples 4 and 5 were set to 1.45 g/cm³ and 1.85 g/cm³, respectively, and were each subjected to a battery characteristic evaluation similar to that on Example 1. The number of samples n was set to 100 for each of Examples 4 and 5. The results are also presented in Table 1.

Comparative Example 1

Figure 11:
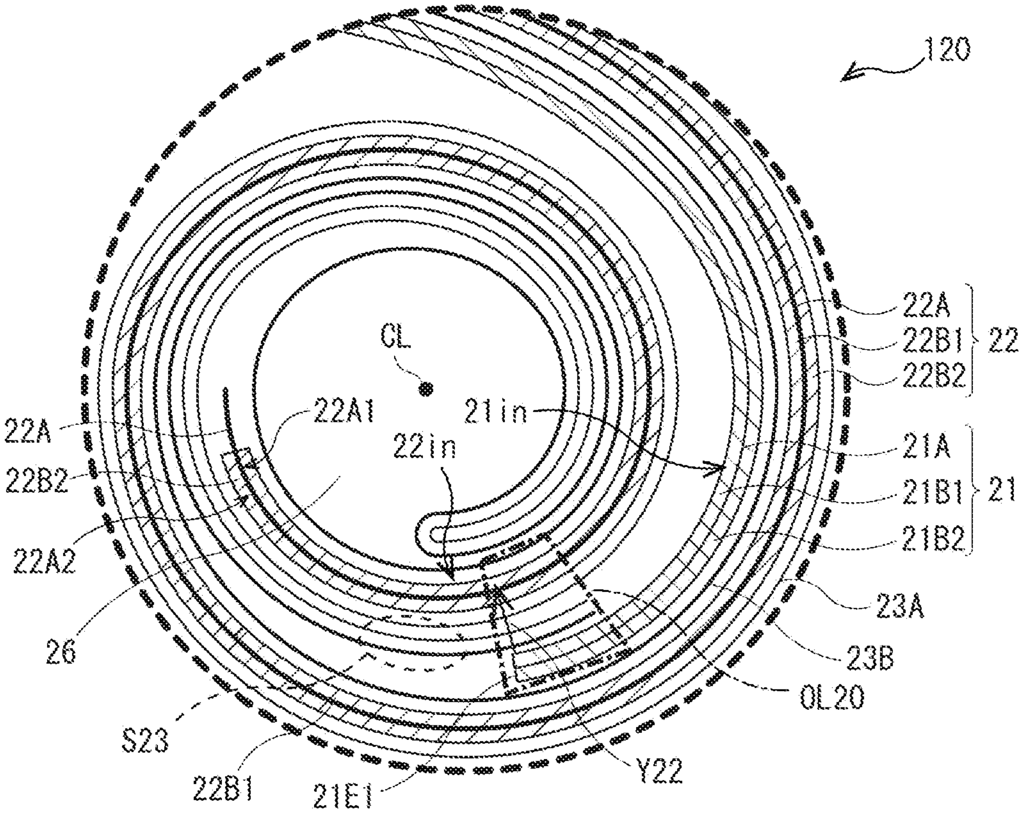
FIG. 11 is a sectional diagram illustrating a configuration example of a sectional structure of a wound electrode body of Comparative example 1.

As Comparative example 1, a lithium-ion secondary battery including a wound electrode body 120 illustrated in FIG. 11 was fabricated. The number of samples n of Comparative example 1 was set to 100. In the wound electrode body 120 of Comparative example 1, as illustrated in FIG. 11, the inner periphery side negative electrode active material layer 22B1 was provided in a region overlapping with the inner periphery side edge 21E1 of the inner periphery side positive electrode active material layer 21B1 in the radial direction of the wound electrode body 120. In other words, in the wound electrode body 120 of Comparative example 1, the inner periphery side negative electrode active material layer 22B1 was allowed to be present also at the location Y22, indicated by an arrow in FIG. 11, corresponding to the inner periphery side edge 21E1 in the radial direction of the wound electrode body 120. Accordingly, in Comparative example 1, the inner periphery side edge of the inner periphery side negative electrode active material layer 22B1 was located closer to the central axis of the wound electrode body 120 than the inner periphery side edge of the outer periphery side negative electrode active material layer 22B2. Except for the above-described difference, the lithium-ion secondary battery of Comparative example 1 had a configuration similar to that of the secondary battery 1 of Example 1. The lithium-ion secondary battery of Comparative example 1 was also subjected to a battery characteristic evaluation similar to that on Example 1. The results are also presented in Table 1.

Comparative Example 2

A lithium-ion secondary battery of Comparative example 2 was fabricated in a manner similar to that in Comparative example 1 and was subjected to a battery characteristic evaluation similar to that on Example 1 except that the discharge current in the above-described cycling test conditions was set to 50 A. The number of samples n of Comparative example 2 was set to 100. The results are also presented in Table 1.

Comparative Example 3

Figure 12:
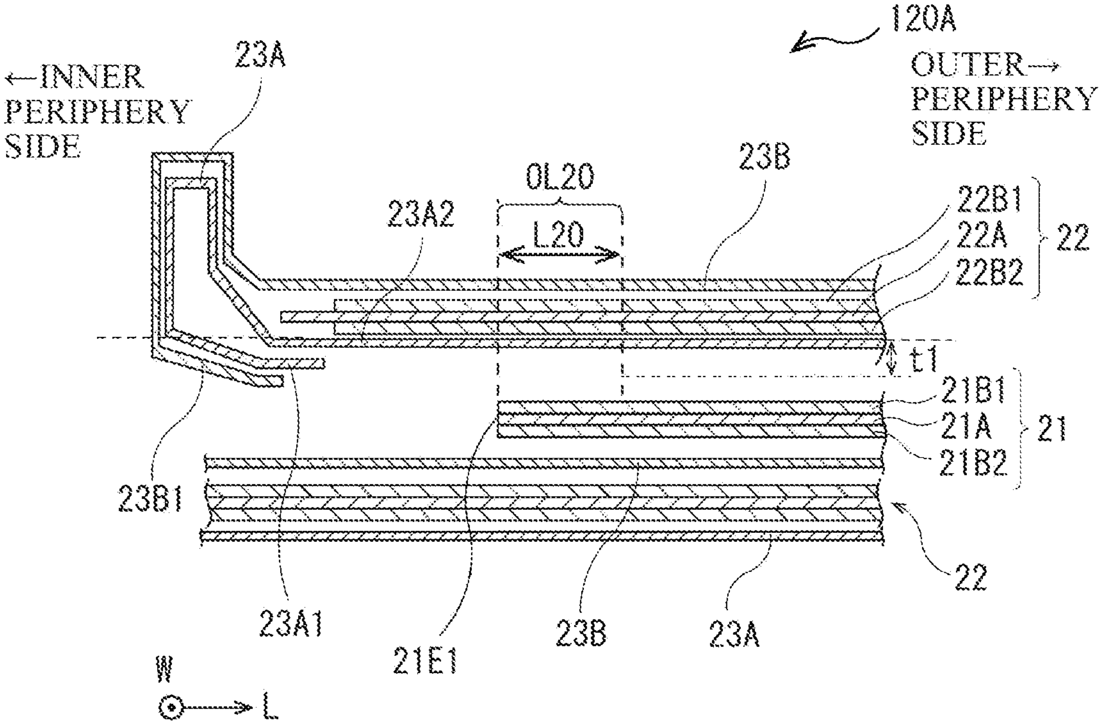
FIG. 12 is a sectional diagram illustrating a configuration example of a sectional structure of a wound electrode body of Comparative example 3.

As Comparative example 3, a lithium-ion secondary battery including a wound electrode body 120A illustrated in FIG. 12 was fabricated. The number of samples n of Comparative example 3 was set to 100. For the lithium-ion secondary battery of Comparative example 3, when fabricating the wound electrode body 120A, as illustrated in FIG. 12, neither of the inner periphery side end part 23A1 of the first separator member 23A and the inner periphery side end part 23B1 of the second separator member 23B that were folded back was allowed to reach the inner periphery side edge 21E1 of the positive electrode 21. In other words, neither of the inner periphery side end part 23A1 and the inner periphery side end part 23B1 was allowed to be present between the inner periphery side edge 21E1 of the positive electrode 21 and the negative electrode 22. Furthermore, the inner periphery side negative electrode active material layer 22B1 was provided in a region overlapping with the inner periphery side edge 21E1 of the inner periphery side positive electrode active material layer 21B1 in the radial direction of the wound electrode body 120A. Accordingly, in Comparative example 3, the inner periphery side edge of the inner periphery side negative electrode active material layer 22B1 was located closer to the central axis of the wound electrode body 120A than the inner periphery side edge of the outer periphery side negative electrode active material layer 22B2. Except for the above-described differences, the lithium-ion secondary battery of Comparative example 3 had a configuration similar to that of the secondary battery 1 of Example 1. The lithium-ion secondary battery of Comparative example 3 was also subjected to a battery characteristic evaluation similar to that on Example 1. The results are also presented in Table 1.

Comparative Examples 4 and 5

Lithium-ion secondary batteries of Comparative examples 4 and 5 were fabricated in a manner similar to that in Comparative example 1 except that the volume densities of the negative electrode active material layers 22B in Comparative examples 4 and 5 were set to 1.45 g/cm$^3$ and 1.85 g/cm$^3$, respectively, and were each subjected to a battery characteristic evaluation similar to that on Example 1. The number of samples n was set to 100 for each of Comparative examples 4 and 5. The results are also presented in Table 1.

As indicated in Table 1, for each of Examples 1 to 5, the number of samples in which the short circuit occurred was zero out of the 100 samples. In contrast, for each of Comparative examples 1 to 5, the short circuit occurred in one to ten samples out of the 100 samples. One reason for this may be as follows. It is considered that in each of Comparative examples 1 to 5, expansion of the wound electrode body 120 or 120A occurring in association with charging and discharging caused a large stress to be applied locally to the separator 23 interposed between the inner periphery side edge 21E1 of the inner periphery side positive electrode active material layer 21B1 and the outer periphery side negative electrode active material layer 22B2, which caused damage to a portion of the separator 23, resulting in the short circuit between the positive electrode 21 and the negative electrode 22. In contrast, for Examples 1 to 5, it was confirmed that a portion of the negative electrode 22 corresponding to the inner periphery side edge 21E1 of the inner periphery side positive electrode active material layer 21B1 in the radial direction and a portion in the vicinity thereof greatly bent toward the winding center upon expansion of the wound electrode body 20 occurring in association with charging and discharging. It is considered that such bending of those portions of the negative electrode 22 mitigated the stress applied to the separator 23 interposed between the inner periphery side edge 21E1 of the inner periphery side positive electrode active material layer 21B1 and the outer periphery side negative electrode active material layer 22B2.

Further, a comparison between Comparative example 1 and Comparative example 2 indicates that Comparative example 2 in which the cycling test was performed at a higher discharge current value was larger in the number of occurrences of the short circuit than Comparative example 1. This is presumably because a portion of the separator 23 located at a position corresponding to the inner periphery side edge 21E1 was subjected to a higher stress in Comparative example 2 than in Comparative example 1. In contrast, no short circuit occurred in each of Examples 1 and 2 in which the inner periphery side negative electrode active material layer 22B1 was not provided in the region overlapping with the inner periphery side edge 21E1 of the inner periphery side positive electrode active material layer 21B1, that is, the inner periphery side edge of the outer periphery side negative electrode active material layer 22B2 was located closer to the central axis of the wound electrode body 20 than the inner periphery side edge of the inner periphery side negative electrode active material layer 22B1. This is presumably because such a configuration mitigated the stress applied to the separator 23 upon charging and discharging.

Further, a comparison between Comparative example 1 and Comparative example 3 indicates that Comparative example 3 in which the folded-back portion of the separator on the winding center side of the wound electrode body was not present between the inner periphery side edge 21E1 and the negative electrode 22 was larger in the number of occurrences of the short circuit than Comparative example 1. This is presumably because the portion of the separator 23 located at the position corresponding to the inner periphery side edge 21E1 was subjected to a higher stress in Comparative example 3 than in Comparative example 1. In contrast, no short circuit occurred in each of Examples 1 and 3 in which the inner periphery side negative electrode active material layer 22B1 was not provided in the region overlapping with the inner periphery side edge 21E1 of the inner periphery side positive electrode active material layer 21B1, that is, the inner periphery side edge of the outer periphery side negative electrode active material layer 22B2 was located closer to the central axis of the wound electrode body 20 than the inner periphery side edge of the inner periphery side negative electrode active material layer 22B1. This is presumably because such a configuration mitigated the stress applied to the separator 23 upon charging and discharging.

Moreover, by comparing Comparative example 1 with Comparative examples 4 and 5, it was confirmed that the number of occurrences of the short circuit increased with increasing volume density of the negative electrode active material layer 22B. In contrast, no short circuit occurred in each of Examples 1, 4, and 5. Presumably, the configuration in which the inner periphery side negative electrode active material layer 22B1 was not provided in the region overlapping with the inner periphery side edge 21E1 of the inner periphery side positive electrode active material layer 21B1 sufficiently mitigated the stress applied to the separator 23 upon charging and discharging.

Figure 13:
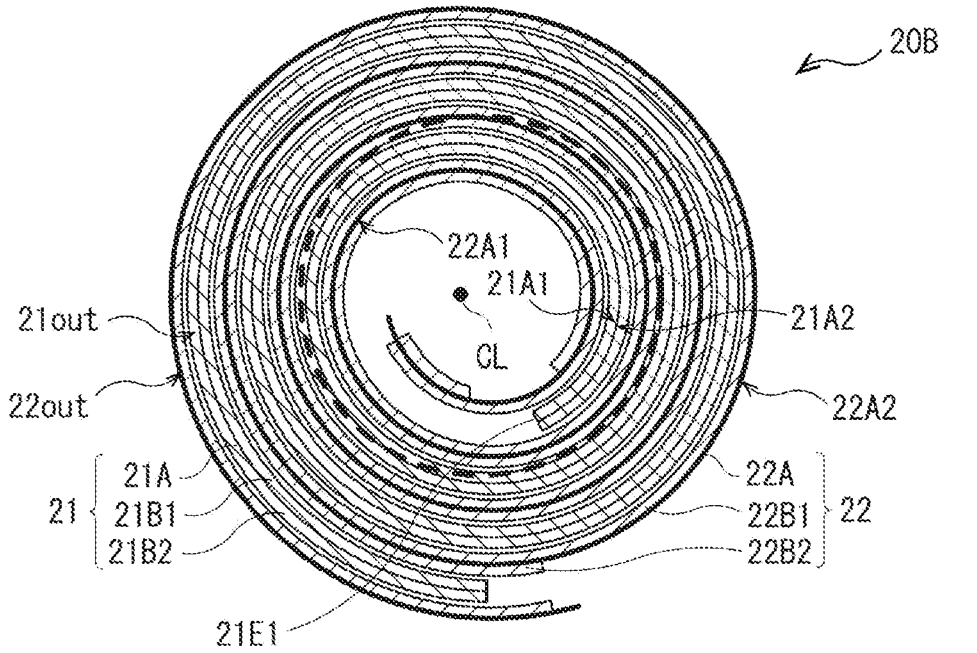
FIG. 13 is a sectional diagram illustrating a configuration example of a sectional structure of a wound electrode body according to another modification example.

Although an embodiment of the present disclosure has been described herein including with reference to Examples, the configuration of an embodiment of the present disclosure is not limited thereto, and is therefore modifiable in a variety of suitable ways. For example, in an embodiment described above, the inner periphery side negative electrode active material layer may be provided in the winding portion of the wound electrode body in the second and subsequent winds from the winding center of the wound electrode body; however, the present disclosure is not limited thereto. For example, as in a wound electrode body 20B illustrated in FIG. 13, the inner periphery side negative electrode active material layer 22B1 may be absent only in a region overlapping with the inner periphery side edge 21E1 of the inner periphery side positive electrode active material layer 21B1 and a region in the vicinity thereof.

Further, although the description has been given of an embodiment including Examples where the electrode reactant is lithium, the electrode reactant is not particularly limited. In an embodiment, the electrode reactant may be another alkali metal such as sodium or potassium, or may be an alkaline earth metal such as beryllium, magnesium, or calcium, as described above. In an embodiment, the electrode reactant may be another light metal such as aluminum.

The effects described herein are mere examples, and effects of an embodiment of the present disclosure are therefore not limited thereto. Accordingly, an embodiment of the present disclosure may achieve any other suitable effect.

Further, the present disclosure encompasses any possible combination of some or all of the various embodiments and the modifications described herein and incorporated herein. It is possible to achieve at least the following configurations from an embodiment of the present disclosure.

(1)

A secondary battery including:

a wound electrode body including a stack wound around a central axis extending in a first direction, the stack including a positive electrode, a negative electrode, and a separator, the positive electrode and the negative electrode being stacked with the separator interposed therebetween;

a positive electrode current collector plate disposed to face a first end face of the wound electrode body, the first end face being an end face in the first direction;

a negative electrode current collector plate disposed to face a second end face of the wound electrode body, the second end face being opposite to the first end face in the first direction;

an electrolytic solution; and a battery can containing the wound electrode body, the positive electrode current collector plate, the negative electrode current collector plate, and the electrolytic solution, in which the positive electrode includes a positive electrode current collector including an inner peripheral surface of the positive electrode current collector located on a side of the central axis of the wound electrode body, and an outer peripheral surface of the positive electrode current collector opposite to the inner peripheral surface of the positive electrode current collector, an inner periphery side positive electrode active material layer covering a portion or all of the inner peripheral surface of the positive electrode current collector, and an outer periphery side positive electrode active material layer covering a portion or all of the outer peripheral surface of the positive electrode current collector, the negative electrode includes a negative electrode current collector including an inner peripheral surface of the negative electrode current collector located on the side of the central axis of the wound electrode body, and an outer peripheral surface of the negative electrode current collector opposite to the inner peripheral surface of the negative electrode current collector, an inner periphery side negative electrode active material layer covering a portion or all of the inner peripheral surface of the negative electrode current collector, and an outer periphery side negative electrode active material layer covering a portion or all of the outer peripheral surface of the negative electrode current collector, in the wound electrode body, an innermost wind portion of the negative electrode is located on an inner side relative to an innermost wind portion of the positive electrode, and the outer periphery side negative electrode active material layer has an inner periphery side edge located closer to the central axis of the wound electrode body than an inner periphery side edge of the inner periphery side negative electrode active material layer.

(2)

The secondary battery according to (1), in which the inner periphery side negative electrode active material layer is provided in a winding portion of the wound electrode body in a second and subsequent winds from a winding center of the wound electrode body.

(3)

The secondary battery according to (1) or (2), in which the inner periphery side negative electrode active material layer is provided, on the inner peripheral surface of the negative electrode current collector, at a location opposed to the outer periphery side positive electrode active material layer.

(4)

The secondary battery according to any one of (1) to (3), in which the outer periphery side negative electrode active material layer is provided, on the outer peripheral surface of the negative electrode current collector, at a location opposed to the inner periphery side positive electrode active material layer.

(5)

The secondary battery according to any one of (1) to (4), in which the electrolytic solution includes a fluorine compound and a nitrile compound.

(6)

The secondary battery according to (5), in which the fluorine compound includes at least one of fluorinated ethylene carbonate, trifluorocarbonate, trifluoroethyl methyl carbonate, a fluorinated carboxylic acid ester, or a fluorine ether.

(7)

The secondary battery according to (5), in which the nitrile compound includes succinonitrile.

(8)

The secondary battery according to any one of (1) to (7), in which the electrolytic solution includes lithium hexafluorophosphate as an electrolyte salt, and a concentration of the electrolyte salt in the electrolytic solution is higher than or equal to 1.25 moles per kilogram and lower than or equal to 1.45 moles per kilogram.

(9)

The secondary battery according to any one of (1) to (8), in which the inner periphery side negative electrode active material layer and the outer periphery side negative electrode active material layer each include a negative electrode active material including at least one of silicon, silicon oxide, a carbon-silicon compound, or a silicon alloy.

(10)

The secondary battery according to any one of (1) to (9), in which the inner periphery side positive electrode active material layer and the outer periphery side positive electrode active material layer each include a positive electrode active material including at least one of lithium cobalt oxide, lithium nickel cobalt manganese oxide, or lithium nickel cobalt aluminum oxide.

(11)

A battery pack including:

the secondary battery according to any one of (1) to (10);

a processor configured to control the secondary battery; and an outer package body containing the secondary battery.

According to a secondary battery or a battery pack of an embodiment of the present disclosure, an inner periphery side edge of an outer periphery side negative electrode active material layer is located closer to a central axis of a wound electrode body than an inner periphery side edge of an inner periphery side negative electrode active material layer. In other words, the inner periphery side negative electrode active material layer is not provided in a region, of a negative electrode, that overlaps with an inner periphery side edge of an inner periphery side positive electrode active material layer. This makes it easier for the negative electrode to change its shape to be closer to the central axis of the wound electrode body. Accordingly, even when expansion and contraction of the wound electrode body occur in association with charging and discharging, it is possible to mitigate stress applied to the separator. This makes it possible to achieve high reliability.

Note that effects of an embodiment of the present disclosure are not necessarily limited to those described herein and may include any of suitable effects achievable in relation to the present technology.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A secondary battery comprising:

a wound electrode body including a stack wound around a central axis extending in a first direction, the stack including a positive electrode, a negative electrode, and a separator, the positive electrode and the negative electrode being stacked with the separator interposed therebetween;

a positive electrode current collector plate disposed to face a first end face of the wound electrode body, the first end face being an end face in the first direction;

a negative electrode current collector plate disposed to face a second end face of the wound electrode body, the second end face being opposite to the first end face in the first direction;

an electrolytic solution; and a battery can containing the wound electrode body, the positive electrode current collector plate, the negative electrode current collector plate, and the electrolytic solution, wherein the positive electrode includes a positive electrode current collector including an inner peripheral surface of the positive electrode current collector located on a side of the central axis of the wound electrode body, and an outer peripheral surface of the positive electrode current collector opposite to the inner peripheral surface of the positive electrode current collector, an inner periphery side positive electrode active material layer covering a portion or all of the inner peripheral surface of the positive electrode current collector, an outer periphery side positive electrode active material layer covering a portion or all of the outer peripheral surface of the positive electrode current collector, and a positive electrode exposed part in which the positive electrode current collector is exposed without being covered with the positive electrode active material layer, in a state in which the stack is wound around the central axis, the positive electrode exposed part includes a plurality of first edge parts adjacent to each other in a radial direction of the wound electrode body, the plurality of first edge parts being bent toward the central axis and overlapping with each other on the first end face, the positive electrode current collector plate is joined to the plurality of first edge parts on the first end face, the negative electrode includes a negative electrode current collector including an inner peripheral surface of the negative electrode current collector located on the side of the central axis of the wound electrode body, and an outer peripheral surface of the negative electrode current collector opposite to the inner peripheral surface of the negative electrode current collector, an inner periphery side negative electrode active material layer covering a portion or all of the inner peripheral surface of the negative electrode current collector, an outer periphery side negative electrode active material layer covering a portion or all of the outer peripheral surface of the negative electrode current collector, and a negative electrode exposed part in which the negative electrode current collector is exposed without being covered with the negative electrode active material layer, in the state in which the stack is wound around the central axis, the negative electrode exposed part includes a plurality of second edge parts adjacent to each other in the radial direction of the wound electrode body, the plurality of second edge parts being bent toward the central axis and overlapping with each other on the second end face, the negative electrode current collector plate is joined to the plurality of second edge parts on the second end face, in the wound electrode body, an innermost wind portion of the negative electrode is located on an inner side relative to an innermost wind portion of the positive electrode, the outer periphery side negative electrode active material layer has an inner periphery side edge located closer to the central axis of the wound electrode body than an inner periphery side edge of the inner periphery side negative electrode active material layer.

2. The secondary battery according to claim 1, wherein the inner periphery side negative electrode active material layer is provided in a winding portion of the wound electrode body in a second and subsequent winds from a winding center of the wound electrode body.

3. The secondary battery according to claim 1, wherein the inner periphery side negative electrode active material layer is provided, on the inner peripheral surface of the negative electrode current collector, at a location opposed to the outer periphery side positive electrode active material layer.

4. The secondary battery according to claim 1, wherein the outer periphery side negative electrode active material layer is provided, on the outer peripheral surface of the negative electrode current collector, at a location opposed to the inner periphery side positive electrode active material layer.

5. The secondary battery according to claim 1, wherein the electrolytic solution includes a fluorine compound and a nitrile compound.

6. The secondary battery according to claim 5, wherein the fluorine compound includes at least one of fluorinated ethylene carbonate, trifluorocarbonate, trifluoroethyl methyl carbonate, a fluorinated carboxylic acid ester, or a fluorine ether.

7. The secondary battery according to claim 5, wherein the nitrile compound comprises succinonitrile.

8. The secondary battery according to claim 1, wherein
the electrolytic solution includes lithium hexafluorophosphate as an electrolyte salt, and
a concentration of the electrolyte salt in the electrolytic solution is higher than or equal to 1.25 moles per kilogram and lower than or equal to 1.45 moles per kilogram.

9. The secondary battery according to claim 1, wherein the inner periphery side negative electrode active material layer and the outer periphery side negative electrode active material layer each include a negative electrode active material including at least one of silicon, silicon oxide, a carbon-silicon compound, or a silicon alloy.

10. The secondary battery according to claim 1, wherein the inner periphery side positive electrode active material layer and the outer periphery side positive electrode active material layer each include a positive electrode active material including at least one of lithium cobalt oxide, lithium nickel cobalt manganese oxide, or lithium nickel cobalt aluminum oxide.

11. A battery pack comprising:
the secondary battery according to claim 1;
a processor configured to control the secondary battery; and
an outer package body containing the secondary battery.

12. The secondary battery according to claim 1, wherein
an inner periphery side end part of the separator is folded back and interposed between an inner periphery side edge of the inner periphery side positive electrode active material layer and the negative electrode.

13. The secondary battery according to claim 1, wherein
the separator includes a first separator member and a second separator member, and
an inner periphery side end part of at least one of the first separator member or the second separator member is folded back and interposed between an inner periphery side edge of the inner periphery side positive electrode active material layer and the negative electrode.

* * * * *